United States Patent
Bertolotti et al.

(10) Patent No.: US 12,338,925 B2
(45) Date of Patent: Jun. 24, 2025

(54) FITTING FOR CONNECTING PIPES, IN PARTICULAR FLEXIBLE PIPES

(71) Applicant: I.V.A.R. S.P.A., Prevalle (IT)

(72) Inventors: Umberto Bertolotti, Prevalle (IT); Mario Contini, Flero (IT)

(73) Assignee: I.V.A.R. S.P.A., Prevalle (IT)

( * ) Notice: Subject to any disclaimer, the term of this patent is extended or adjusted under 35 U.S.C. 154(b) by 546 days.

(21) Appl. No.: 17/431,925

(22) PCT Filed: Feb. 10, 2020

(86) PCT No.: PCT/IB2020/051026
§ 371 (c)(1),
(2) Date: Aug. 18, 2021

(87) PCT Pub. No.: WO2020/170066
PCT Pub. Date: Aug. 27, 2020

(65) Prior Publication Data
US 2022/0136633 A1    May 5, 2022

(30) Foreign Application Priority Data
Feb. 18, 2019 (IT) .................. 102019000002345

(51) Int. Cl.
*F16L 33/207* (2006.01)
(52) U.S. Cl.
CPC .................. *F16L 33/2076* (2013.01)
(58) Field of Classification Search
CPC .................. F16L 13/141; F16L 33/2076
See application file for complete search history.

(56) References Cited

U.S. PATENT DOCUMENTS

| | | | |
|---|---|---|---|
| 1,693,839 A * | 12/1928 | Faudi | B60G 7/00 29/508 |
| 2,147,355 A * | 2/1939 | Scholtes | F16L 33/213 285/259 |

(Continued)

FOREIGN PATENT DOCUMENTS

| EP | 1316753 A2 * | 6/2003 | ............ F16L 13/141 |
|---|---|---|---|
| EP | 1882876 A1 | 1/2008 | |

(Continued)

OTHER PUBLICATIONS

Search Report dated Jun. 3, 2020 in corresponding International Application No. PCT/IB2020/051026, 5 pages.

(Continued)

*Primary Examiner* — Zachary T Dragicevich
*Assistant Examiner* — James A Linford
(74) *Attorney, Agent, or Firm* — MH2 TECHNOLOGY LAW GROUP LLP

(57) ABSTRACT

A fitting for connecting pipes, in particular flexible pipes, includes a first tubular element, provided with a first inlet/outlet opening and at its interior defining a first duct, and a second tubular element, provided with a second inlet/outlet opening and at its interior defining a second duct. The two tubular elements are connected together in a manner such that the first and second ducts are in communication. The first tubular element is provided with at least one through opening, between an external surface thereof facing outwards and an internal surface directed towards the first duct. The through opening defines a respective empty space between the external surface and the internal surface of the first tubular element. The fitting operates in an insertion condition, in which it allows a pipe to be fitted around said first tubular element, and a clamping condition, in which the pipe is pressed and stably locked on the first tubular element. In the clamping condition, the empty space defined by the (Continued)

through opening is occupied by a portion of the pipe pressed on the first tubular element.

16 Claims, 14 Drawing Sheets

(56) References Cited

U.S. PATENT DOCUMENTS

| | | | |
|---|---|---|---|
| 2,273,398 A | | 2/1942 | Couty et al. |
| 4,850,619 A | | 7/1989 | Lantos et al. |
| 5,215,339 A | * | 6/1993 | Morse ................ F16L 33/02 |
| | | | 285/256 |
| 2006/0226650 A1 | * | 10/2006 | Alder ............. F16L 33/2076 |
| | | | 285/259 |

FOREIGN PATENT DOCUMENTS

| | | | |
|---|---|---|---|
| EP | 2443374 A1 | 4/2012 | |
| EP | 2547947 A1 | 1/2013 | |
| WO | WO-02061322 A1 * | 8/2002 | .......... F16L 25/0036 |
| WO | 2010146337 A1 | 12/2010 | |
| WO | 2011114209 A1 | 9/2011 | |
| WO | WO-2017061877 A1 * | 4/2017 | ............ F16L 13/141 |
| WO | WO-2018002227 A1 * | 1/2018 | ............ F16L 13/148 |

OTHER PUBLICATIONS

Written Opinion dated Jun. 3, 2020 in corresponding International Application No. PCT/IB2020/051026, 9 pages.

* cited by examiner

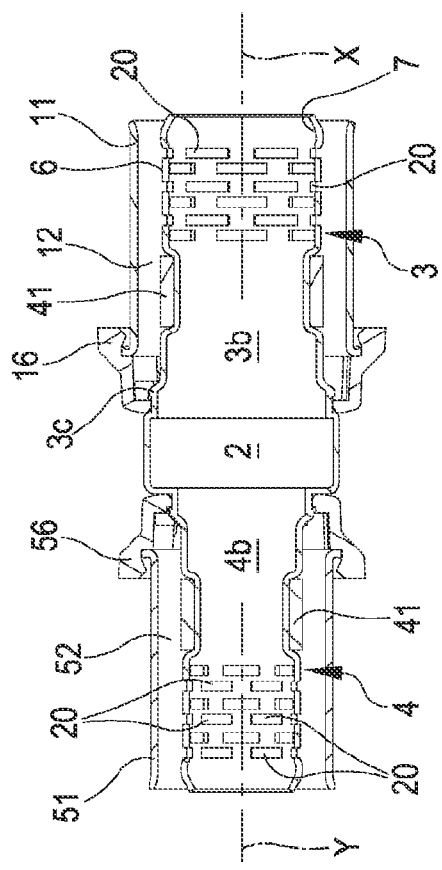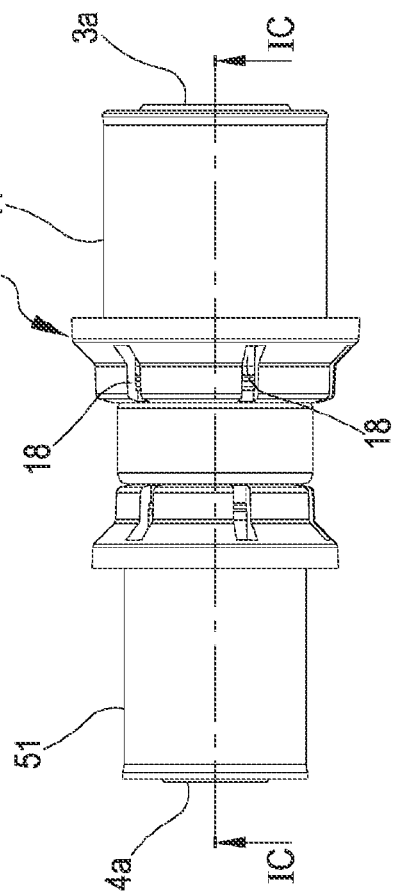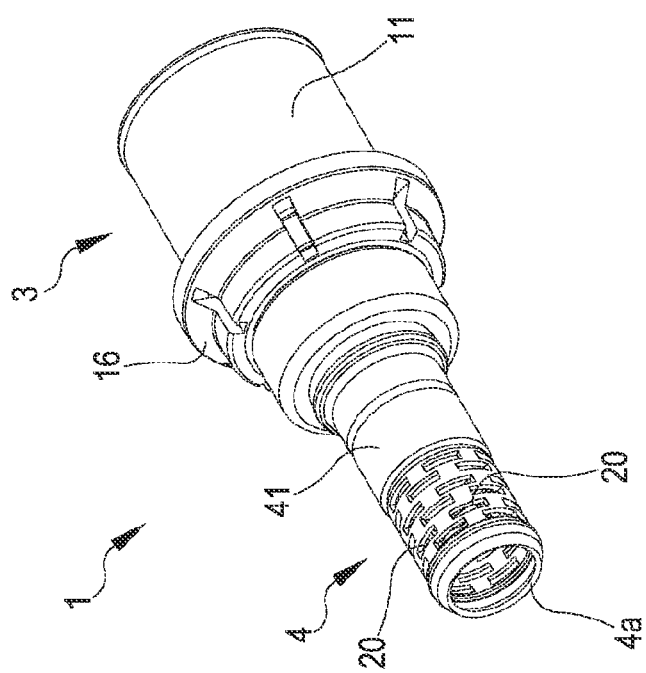

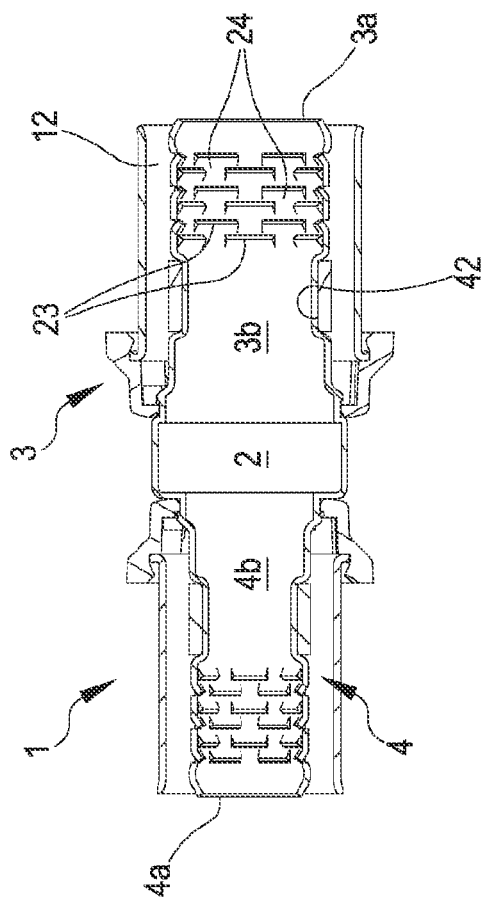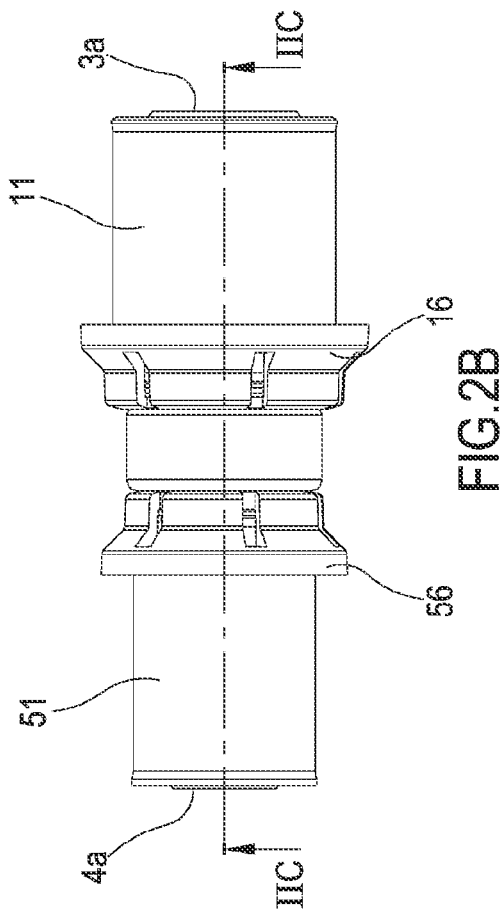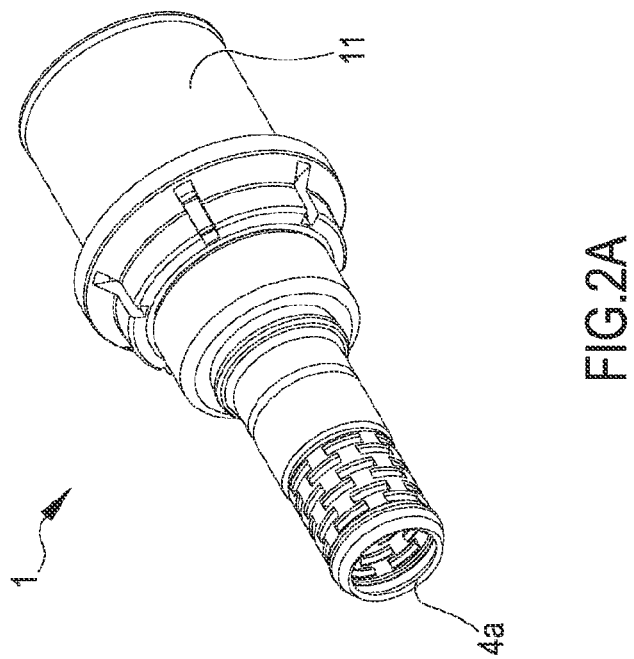

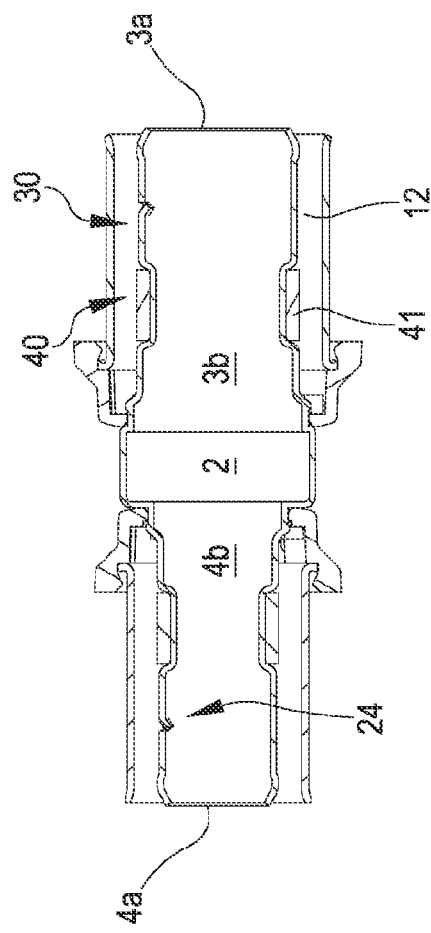
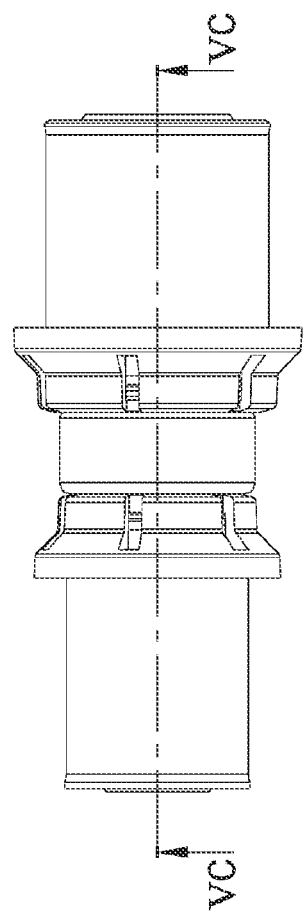
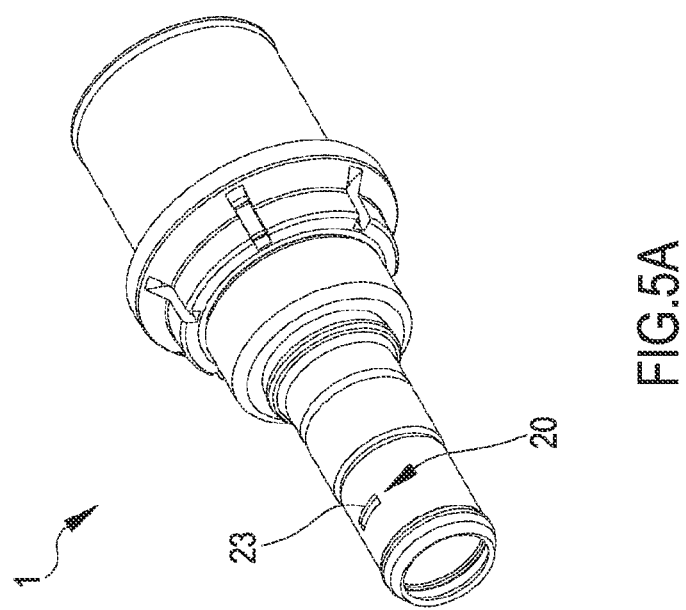
FIG.5C
FIG.5B
FIG.5A

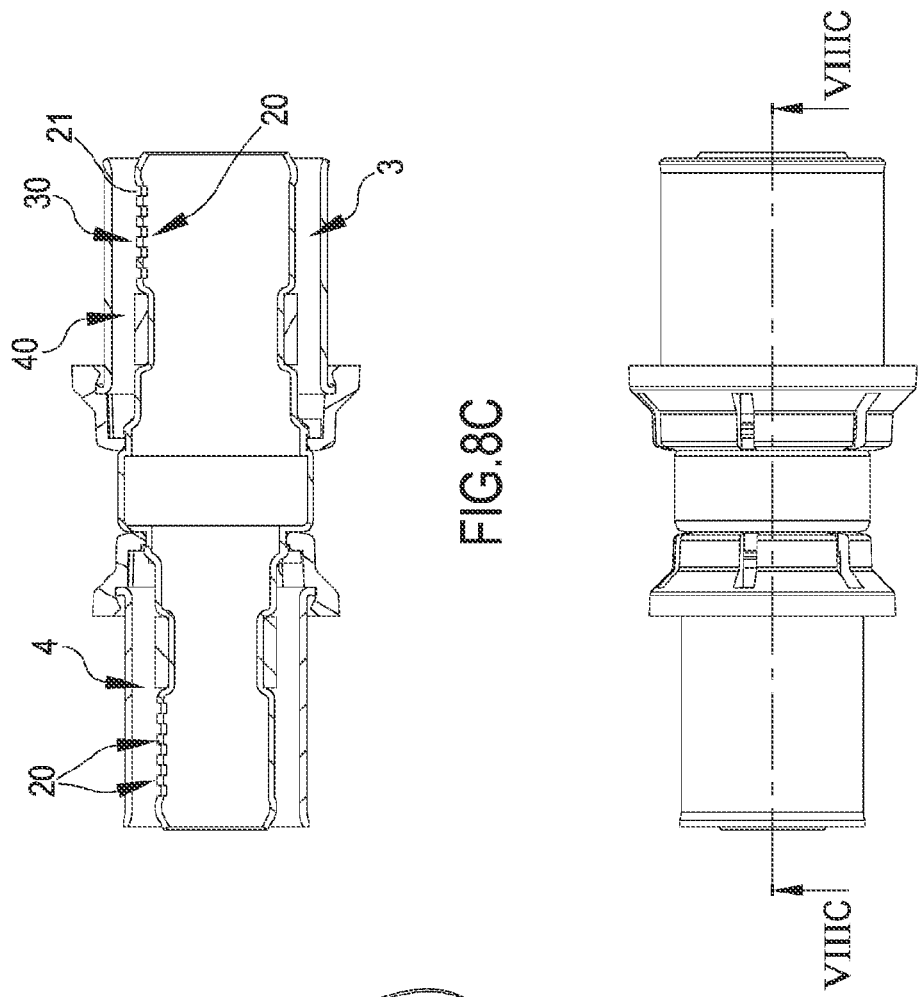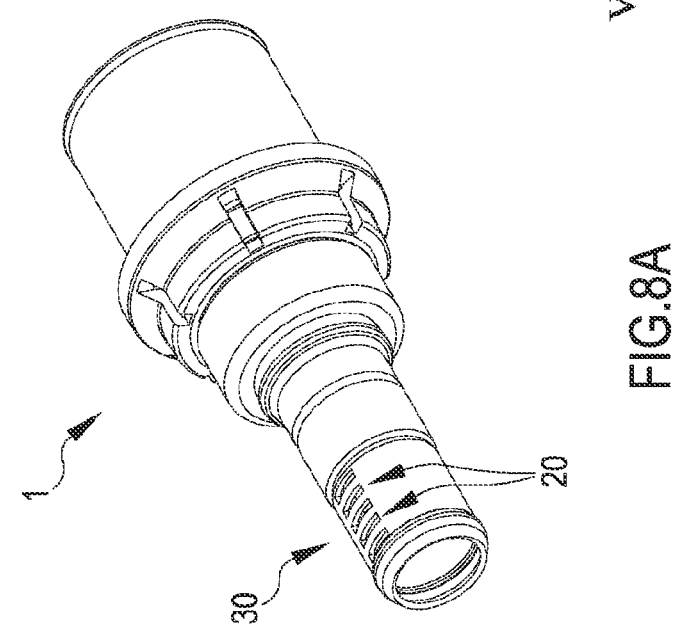

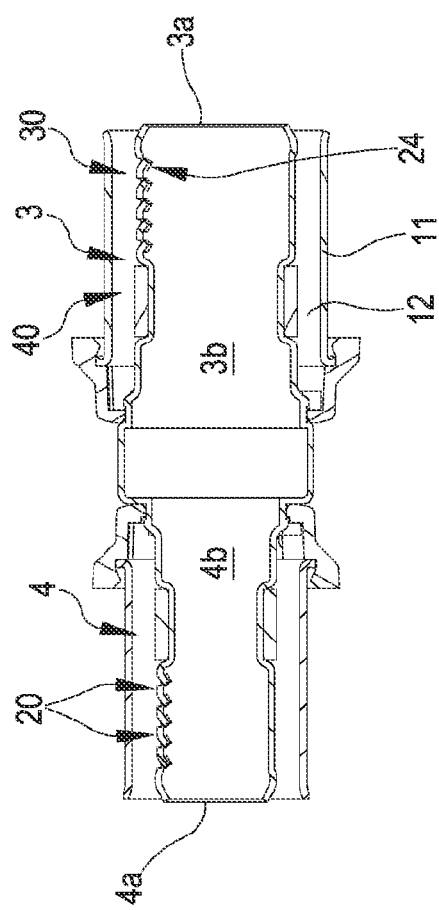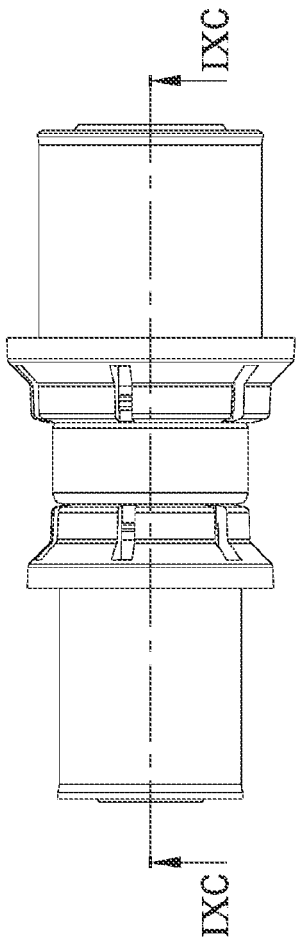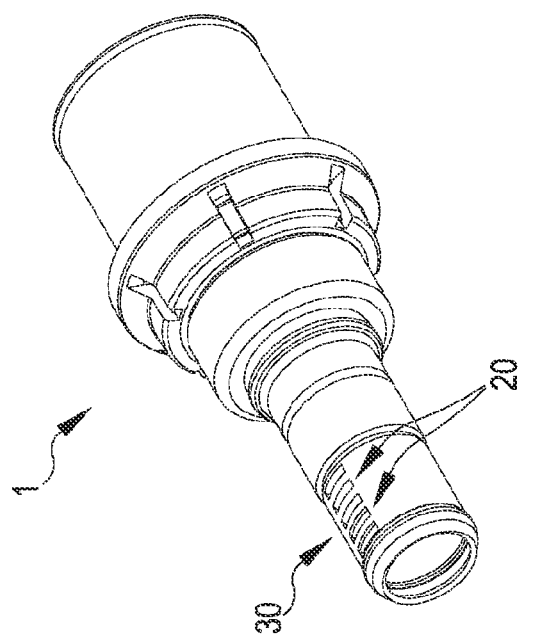
FIG.9C
FIG.9B
FIG.9A

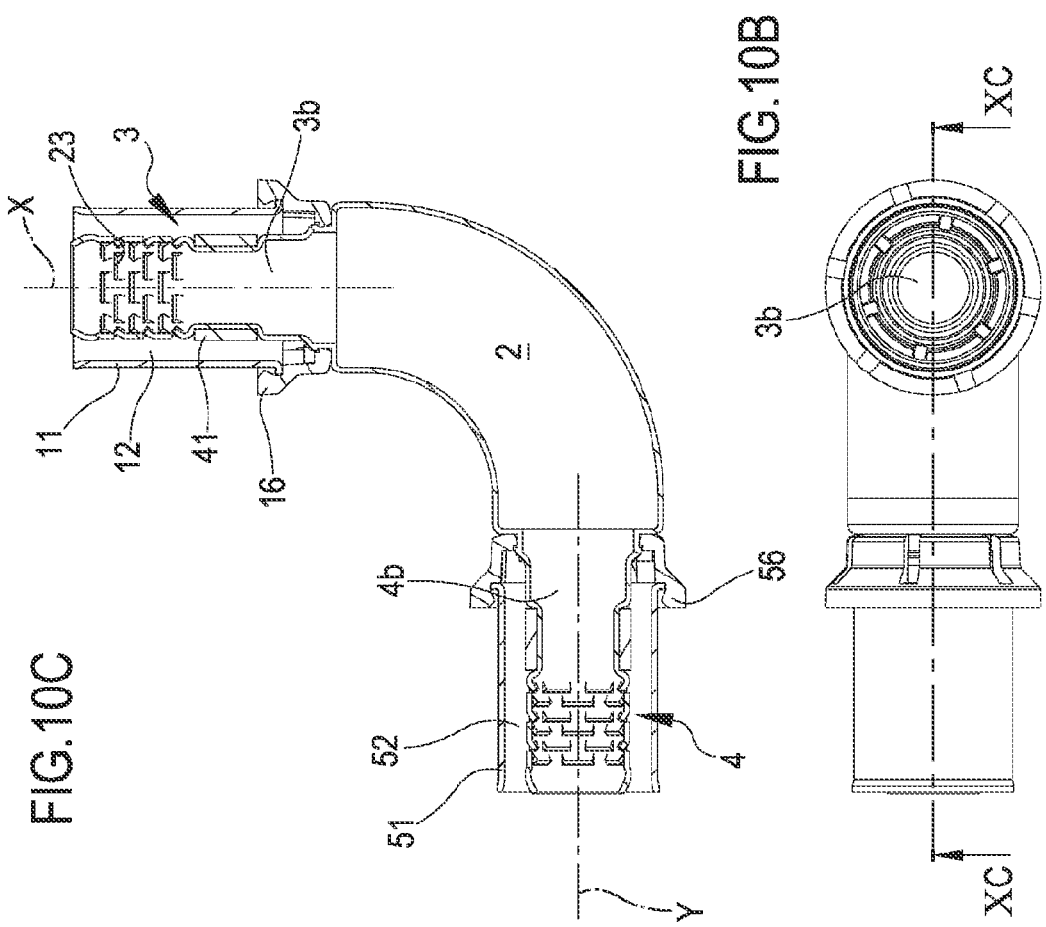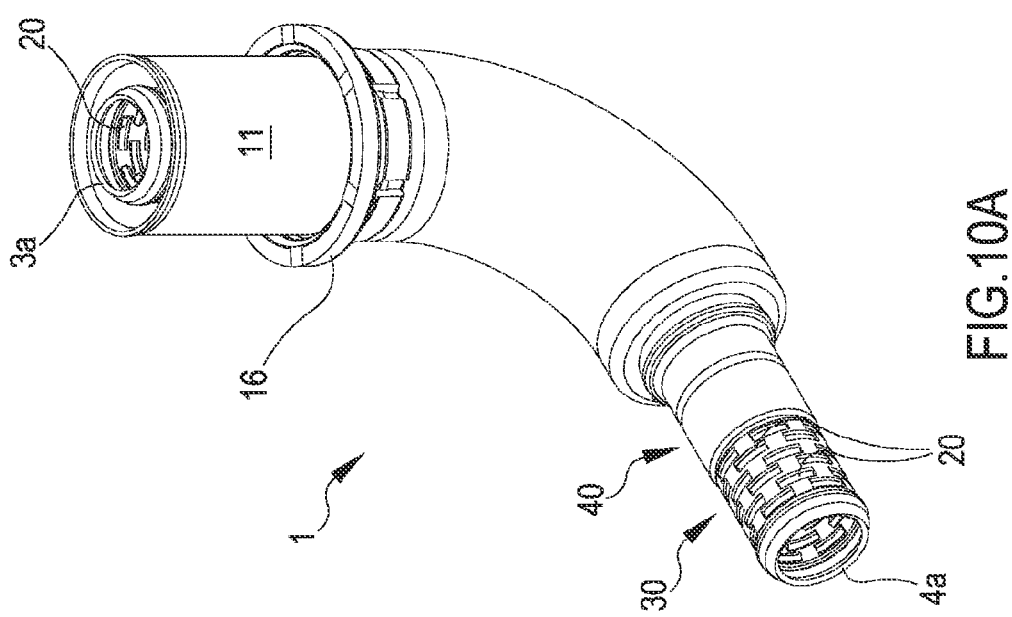

FITTING FOR CONNECTING PIPES, IN PARTICULAR FLEXIBLE PIPES

CROSS-REFERENCE TO RELATED APPLICATIONS

This application is a U.S. National Stage application of PCT/IB2020/051026 filed Feb. 10, 2020, pending, which claims priority to Italian Application No. 102019000002345 filed Feb. 18, 2019, the entire disclosures of which are hereby incorporated by reference.

The present invention relates to a fitting for connecting pipes, and is particularly useful in the connection of flexible pipes for the circulation of pressurized fluids, for example water.

The invention can find advantageous application in the field of thermal-hydraulic and/or water supply systems in residential, commercial or industrial buildings.

As is known, the connection of flexible pipes is generally made by arranging a fitting shaped as a rigid tubular element, provided with two or more terminations which can be coupled to as many pipes and adapted to place the latter in fluid communication with each other in a, externally fluid-tight manner.

One or more terminations of the fitting, intended for coupling a flexible pipe, generally have a shaped anchoring surface to which the flexible pipe is forced to adhere, and to which the flexible pipe is stably anchored upon an elastic or permanent deformation. Such anchoring surface can be made by means of a surface having annular grooves, to which the pipe is forced to be coupled due to its elastic deformability. Such anchoring surfaces are usually made externally with respect to the termination, and the termination itself is thus inserted in one end of the pipe by stably associating thereto. The terminations of the fitting can all be provided with an anchoring surface with grooves, for the attachment of pipes by deformation, or they can be made for example by means of a threaded surface, to which the pipe is forced to engage by screwing; alternatively, a valve can be connected to the threaded surface of the end portion.

In order to ensure a fluid seal between the interior of the tubular element and the exterior of the pipe associated thereto, and therefore to prevent leakage of fluid to the exterior, external sheaths (typically called "bushings") are usually used, for example made of metal, which surround the end of the pipe coupled to the tubular element and are thus permanently deformed, for example by pinching with a gripper, so as to generate compression on the underlying pipe. In this way, the pipe is forced to compress against the underlying termination, generating a stable coupling thereto. Such fittings are generally identified as "press fittings" (or in technical jargon "press fits").

In order to improve the fluid seal between the interior of the fitting/pipe connection and the exterior, gaskets—for example O-rings—are generally provided to be interposed between each termination of the fitting and the respective pipe to which it is coupled.

An example of known press fittings consists of brass fittings, for example of the type described in the patent document EP2677223, to the same Applicant. Such fittings are typically made from brass bars, which are molded to define the shape of the fitting and the internal duct for the passage of fluid. Furthermore, on the external surface of the terminations of the fitting, annular grooves or ribs are made (typically by mechanical machining) which allow the flexible pipe to be anchored to the termination, as illustrated above. In addition, brass fittings typically have one or more gaskets fitted externally to each termination, for example at intermediate positions between the various annular grooves for gripping the pipe. In some cases, the gasket can protrude radially beyond the dimensions of the grooves on the anchoring surface, so as to be pressed and deformed together with the pipe to be connected following the compression of the external sheath (or bushing), so as to adhere more effectively both to the termination of the fitting and to the pipe fitted thereto and prevent leakage of fluid between the latter towards the exterior even in conditions of high operating pressures.

This type of fitting has some drawbacks. First of all, such fittings have a small-diameter fluid passage, since a certain thickness of brass allowing a correct machining of the piece needs to be provided. This results in a reduced transferable flow rate, or in any case a reduced useful internal diameter with respect to the external diameter.

In addition, these fittings—when angular, i.e. when they show an angle (for example 90°) between the terminations suitable for receiving the pipes to be connected—are internally characterized by a sudden change of direction, due to the fact that the internal ducts are typically made using punches that are inserted inside the terminations during the manufacturing step to create the empty space defining the ducts themselves. In other words, making an angular internal duct on brass fittings necessarily leads to the creation of a sharp curve in the internal duct. This causes a very significant drawback, since the presence of a sharp curve introduces high pressure losses (pressure drops) and turbulence in the flow of transported fluid. In the field of press fittings, "zeta value" means a parameter representative of the pressure drop relating to the geometry of the fitting itself, i.e. some sort of "hydraulic resistance": the greater the "zeta value", the greater the pressure drop at the fitting. Typically, the brass fittings described above have high "zeta values" due to the geometry and dimensions determined by the production process.

In order to overcome these drawbacks, a further type of press fitting is known, made from a thin pipe, typically made of steel. Such fittings are obtained by bending, rather than by molding and/or mechanical machining, and allow to obtain soft curves and high diameters of the internal duct. This allows to obtain an even flow and low pressure drops, therefore reaching lower "zeta value" values compared to brass fittings.

However, steel fittings also have significant drawbacks. First of all, steel fittings cannot have end portions with an external anchoring surface being provided with annular grooves/ribs, since the thickness and materials are not sufficient for processing anchors for the pipes to be connected (the external surface is substantially smooth).

This would make it impossible for the pipes to be stably locked to the fitting, and the pipes could therefore unthread or not be stably anchored. In order to overcome this drawback, it is necessary to provide additional means for gripping the pipes when pressing is carried out: the known solutions are therefore provided with additional cylinders which externally surround each end portion. Such additional cylinders are typically made of plastic and provide the end portion with suitable external ribs or protrusions to which the pipe—once pressed—can grip to achieve a stable assembly. Typically, such cylinders are made by co-molding plastic material around the steel tubular section of the fitting: essentially, the grip and attachment of the pipe occurs on the surface of the plastic cylinders in a functionally similar manner to what happens—in brass fittings—on the external grooves made by mechanical machining.

It becomes apparent that the mixed steel-plastic solution is very complex from a production process point of view, and this determines a high manufacturing cost for such type of press fittings.

In addition, in such solution there is a risk that a leakage occurs between each plastic external cylinder and the respective steel termination, for example due to temperature changes in the transported fluid or due to the presence of mechanical stress: this can lead to a faulty operation or the occurrence of faults or malfunctions in the system.

In this situation, the object of the present invention, in its various aspects and/or embodiments, is to provide a fitting for connecting pipes which may be able to overcome one or more of the aforementioned drawbacks.

A further object of the present invention is to provide a fitting for connecting pipes characterized by reduced hydraulic resistance, and capable of transferring the fluid with a regular flow and reduced turbulence, even in the case of an angular fitting.

A further object of the present invention is to propose a fitting for connecting pipes capable of effectively performing the connection of pipes, in particular flexible pipes for the circulation of pressurized fluids, plastic pipes or "multilayer" pipes (i.e. pipes containing overlapping layers of different materials in which, typically, one or more of such layers is made of metal material).

A further object of the present invention is to propose a fitting for connecting pipes characterized by a reduced manufacturing cost. A further object of the present invention is to propose a fitting for connecting pipes which is simple and quick to manufacture.

It is also an object of the present invention to provide a fitting for connecting pipes which has high operating reliability.

A further object of the present invention is to provide a fitting for connecting pipes characterized by a simple and functional construction.

A further object of the present invention is to create alternative solutions, with respect to the prior art, in the manufacture of fittings for connecting pipes, and/or to establish new design fields.

These and any other objects, which will be better shown in the following description, are substantially attained by a fitting for connecting pipes according to one or more of the appended claims, each taken alone (without the depending ones) or in any combination with the other claims, as well as according to the following aspects and/or embodiments, variously combined, also with the aforementioned claims.

Aspects of the invention are listed hereinafter.

In a first aspect thereof, the invention relates to a fitting for connecting pipes, in particular at least one flexible pipe, comprising:

at least one first tubular element provided, at one end thereof, with a first inlet/outlet opening and at its interior defining a first duct;
  at least one second tubular element provided, at one end thereof, with a second inlet/outlet opening and at its interior defining a second duct, said first and second tubular elements being connected to each other at respective opposite ends to the respective inlet/outlet opening, in a manner such that said first and second ducts are in communication with each other and overall define a joint duct of the fitting placing said first inlet/outlet opening and said second inlet/outlet opening in fluid communication,
wherein at least said first tubular element is provided with at least one through opening, between an external surface of the first tubular element facing outwards and an internal surface of the first tubular element directed towards, and defining, said first duct,
said through opening defining a respective empty space between the external surface and the internal surface of the first tubular element,
the fitting being configured for operating at least in an insertion condition, in which it allows a pipe to be fit around said first tubular element, and a clamping condition, in which the pipe is pressed and stably locked, in a fluid-tight manner, on the first tubular element,
wherein in said clamping condition, said empty space defined by said at least one through opening is configured for being occupied by a portion of said pipe pressed on the first tubular element.

In one aspect, the fitting comprises at least one first bushing associable with the first tubular element in a manner such to externally surround it and to create, between the bushing itself and the first tubular element, an annular housing destined to insertingly receive a pipe, such pipe being interposed between the first tubular element and the first bushing, said first bushing having an internal surface, directed towards the first tubular element, and an external surface, wherein said external surface of the first tubular element is directed towards said first bushing, wherein said first bushing is configured for operating in an insertion configuration, when said fitting is in said insertion condition, in which it allows the insertion of a pipe in said annular housing, and a clamping configuration, when said fitting is in said clamping condition, in which it presses and stably locks, in a fluid-tight manner, the pipe in the annular housing, wherein in said clamping configuration said empty space is occupied by a portion of said pipe due to the pressure of said first bushing on the first tubular element.

In an independent aspect thereof, the invention relates to a fitting for connecting pipes, in particular at least one flexible pipe, comprising:

at least one first tubular element provided, at one end thereof, with a first inlet/outlet opening and at its interior defining a first duct;
  at least one second tubular element provided, at one end thereof, with a second inlet/outlet opening and at its interior defining a second duct, said first and second tubular elements being connected to each other at respective opposite ends to the respective inlet/outlet opening, in a manner such that said first and second ducts are in communication with each other and overall define a joint duct of the fitting placing said first inlet/outlet opening and said second inlet/outlet opening in fluid communication.

In one aspect, the fitting further comprises at least one first bushing associable with the first tubular element in a manner such to externally surround it and to create, between the bushing itself and the first tubular element, an annular housing destined to insertingly receive a pipe, such pipe being interposed between the first tubular element and the first bushing, said first bushing having an internal surface, directed towards the first tubular element, and an external surface.

In one aspect, at least the first tubular element is provided with at least one through opening (or notch, hole, socket, slot or orifice), between an external surface of the first tubular element directed towards said first bushing and an internal surface of the first tubular element directed towards, and defining, said first duct.

In one aspect, said through opening defines a respective empty space (i.e. a seat) between the external surface and the internal surface of the first tubular element.

In one aspect, the first bushing is configured for operating at least in an insertion configuration, in which it allows the insertion of a pipe in said annular housing, and a clamping configuration, in which it presses and stably locks, in a fluid-tight manner, the pipe in the annular housing.

In one aspect, in said clamping configuration, said empty space defined by said at least one through opening is configured for being occupied by a portion of said pipe pressed between the first bushing and the first tubular element.

In one aspect, said first tubular element has a substantially hollow cylinder shape with a first longitudinal extension axis and the material that constitutes the first tubular element has a substantially constant section (or thickness), said external surface of the first tubular element defining a first diameter with respect to said first longitudinal extension axis.

In one aspect, said empty space lacks the material constituting said first tubular element at least at the section of the first tubular element itself.

In one aspect, said at least one through opening is made by means of notching and removing the material that constitutes said first tubular element.

In one aspect, said at least one through opening has a specific closed polygonal form, e.g. rectangular, circular, square, triangular.

In one aspect, said at least one through opening has an edge corresponding with said specific closed polygonal form.

In one aspect, said at least one through opening is made by means of executing a through cut (shearing, cutting) in the material that constitutes said first tubular element, said through cut having a specific profile or boundary, and with a bending of part of the material identified by the profile of said cut, preferably towards the interior of the first tubular element, i.e. towards said first longitudinal extension axis in said first duct.

In one aspect, said profile of the through cut has a specific form, preferably C-shaped, U-shaped or with jagged (broken) line formed by one or more consecutive segments.

In one aspect, said empty space (or seat), defined by said through opening, corresponds with the section portion of the first tubular element from which the material was removed, by means of the notching that makes the through opening.

In one aspect, said at least one through opening is made, in a first portion thereof, by means of notching and removing the material that constitutes said first tubular element, and in a second portion thereof, by means of executing a through cut (shearing, cutting) in the material that constitutes said first tubular element, and with a bending of part of the material identified by the profile of the cut, preferably towards the interior of the first tubular element, i.e. towards said first longitudinal extension axis in said first duct, said first and second portions being joined together, i.e. being seamlessly adjacent so as to form a single joint empty space.

In one aspect, the first tubular element has an external diameter, at said external surface, and said empty space extends from said diameter towards the interior of the first tubular element, i.e. towards said first longitudinal extension axis.

In one aspect, said first tubular element is provided with a plurality of through openings, preferably identical to each other, made in different positions on said external surface of the first tubular element.

In one aspect, each through opening can be oriented in any way with respect to the first longitudinal extension axis, i.e. each through opening has its own edge oriented or positioned as desired on said external surface of the first tubular element.

In one aspect, the first tubular element comprises:
a locking portion, which comprises said at least one through opening or said plurality of through openings and is configured for allowing, when said first bushing is in said clamping configuration, the stable connection of the pipe inserted in said annular housing, and preventing the unthreading/removal of the pipe from the fitting;
a seal portion, which comprises at least one seal element externally wound around the first tubular element in a manner such that the seal element is interposed between the seal portion of the tubular element and the pipe inserted in the annular housing, preventing the leakage of fluid between the first duct and the exterior of the fitting.

In one aspect, the seal portion can comprise an annular seat configured to house said seal element.

In one aspect, the fitting has a linear conformation and said first tubular element has the longitudinal extension axis coinciding with a respective longitudinal extension axis of the second tubular element.

In one aspect, the fitting has a curved or angular conformation, in which the respective longitudinal extension axes of the first and second tubular elements form an angle different from 180° with respect to each other.

In one aspect, the fitting has is T-shaped and comprises three tubular elements, two external tubular elements being aligned with each other and a third intermediate tubular element being interposed between the two external tubular elements and perpendicular thereto.

In one aspect, said first tubular element and said second tubular element are made in a single piece.

In an independent aspect thereof, the present invention relates to a method for making a fitting for connecting pipes, in particular flexible pipes, the method comprising the steps of:
arranging at least one first tubular element provided, at one end thereof, with a first inlet/outlet opening and at its interior defining a first duct;
arranging at least one second tubular element provided, at one end thereof, with a second inlet/outlet opening and at its interior defining a second duct,
said first and second ducts being connected to each other at respective opposite ends to the respective inlet/outlet opening, in a manner such that said first and second ducts are in communication with each other and overall define a joint duct of the fitting placing said first inlet/outlet opening and said second inlet/outlet opening in fluid communication.

In one aspect, the method comprises the step of making at least one through opening between an external surface of the first tubular element (directed towards the exterior of the fitting) and an internal surface of the first tubular element directed towards, and defining, said first duct, in a manner such that said through opening defines a respective empty space between the external surface and the internal surface of the first tubular element.

In one aspect, the method comprises a step of arranging at least one first bushing having a hollow cylinder shape and having a longitudinal extension axis.

In one aspect, the method comprises a step of mounting said first bushing on said first tubular element so as to externally surround it and to create, between the internal surface of the bushing itself and the external surface of the first tubular element, an annular housing destined to insertingly receive a pipe, such pipe being interposed between the first tubular element and the bushing.

In one aspect, in said step of making at least one through opening, said at least one through opening is made by means of a notching and removal operation the material that constitutes said first tubular element.

In an alternative aspect, in said step of making at least one though opening, said at least one through opening is made by means of executing a through cut in the material that constitutes said first tubular element, said through cut having a specific profile or boundary, and with a bending of part of the material identified by the profile of said cut, preferably towards the interior of the first tubular element.

In one aspect thereof, the present invention relates to a system comprising at least one fitting according to one or more of the aspects and/or claims and at least one pipe connected to said at least one fitting.

Each of the above aspects of the invention can be taken alone or in combination with any one of the claims or other aspects described.

Further features and advantages will appear more clearly from the detailed description of a number of exemplary, non-exclusive embodiments, also including a preferred embodiment, of a fitting for connecting pipes according to the present invention. Such description is given hereinafter with reference to the accompanying drawings, provided only for illustrative and, therefore, non-limiting purposes, in which:

FIG. 1A shows a perspective view of a possible embodiment of a fitting for connecting pipes, in particular at least one flexible pipe, according to the present invention, with some parts removed;

FIG. 1B shows a side view, with no parts removed, of the fitting in FIG. 1A;

FIG. 10 shows a sectional view of the fitting in FIG. 1B;

FIG. 2A shows a perspective view of a further possible embodiment of a fitting for connecting pipes according to the present invention, with some parts removed;

FIG. 2B shows a side view, with no parts removed, of the fitting in FIG. 2A;

FIG. 2C shows a sectional view of the fitting in FIG. 2B;

FIG. 5A shows a perspective view of a further possible embodiment of a fitting for connecting pipes according to the present invention, with some parts removed;

FIG. 5B shows a side view, with no parts removed, of the fitting in FIG. 5A;

FIG. 5C shows a sectional view of the fitting in FIG. 5B;

FIG. 8A shows a perspective view of a further possible embodiment of a fitting for connecting pipes according to the present invention, with some parts removed;

FIG. 8B shows a side view, with no parts removed, of the fitting in FIG. 8A;

FIG. 8C shows a sectional view of the fitting in FIG. 8B;

FIG. 9A shows a perspective view of a further possible embodiment of a fitting for connecting pipes according to the present invention, with some parts removed;

FIG. 9B shows a side view, with no parts removed, of the fitting in FIG. 9A;

FIG. 9C shows a sectional view of the fitting in FIG. 9B;

FIG. 10A shows a perspective view of a further possible embodiment of a fitting for connecting pipes according to the present invention, with some parts removed;

FIG. 10B shows a top view, with no parts removed, of the fitting in FIG. 10A;

FIG. 100 shows a sectional view of the fitting in FIG. 10B;

Figure 1D:
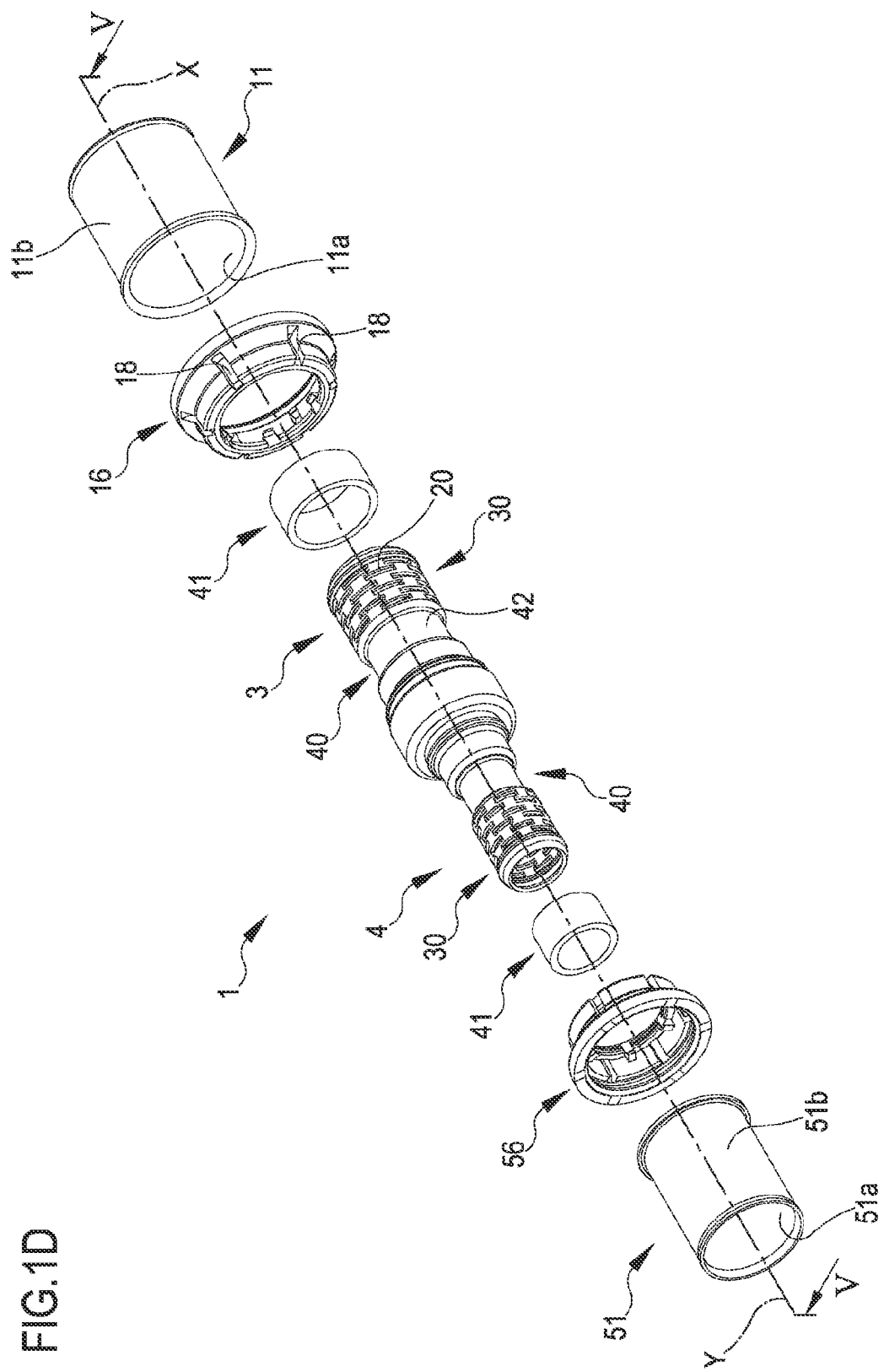
FIG. 1D shows a perspective exploded view of the fitting in FIG. 1B.
Figure 1E:
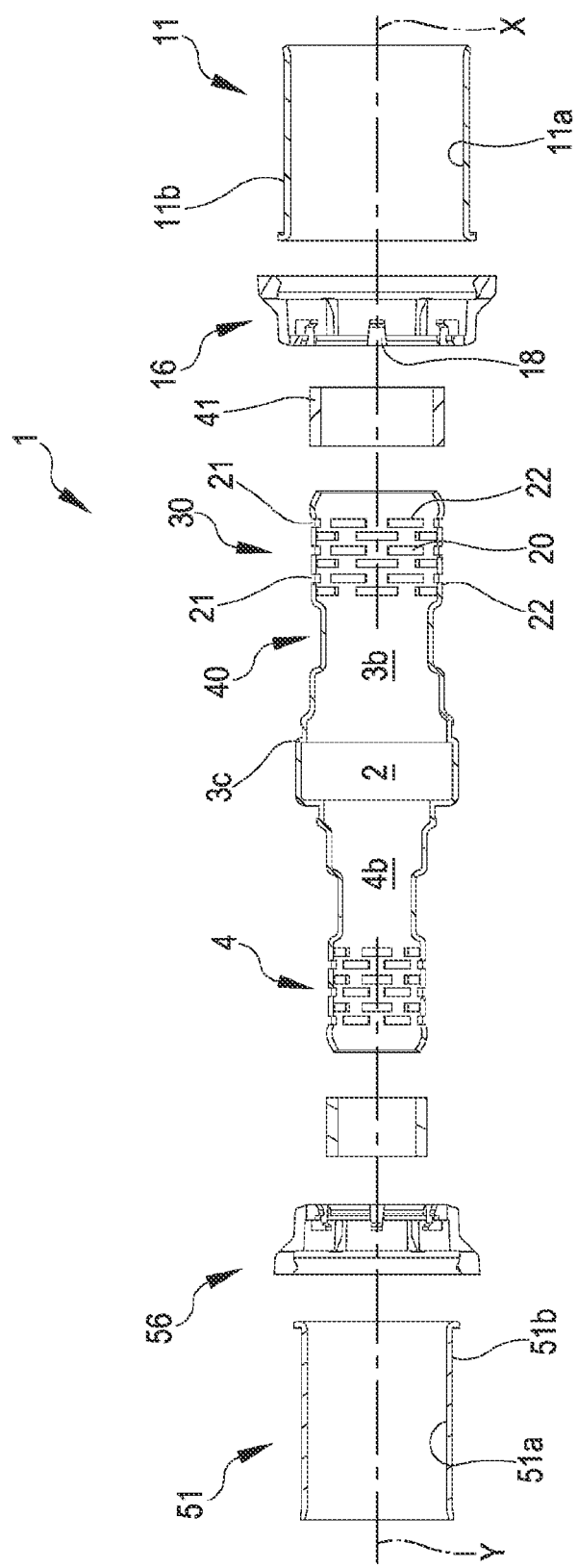
FIG. 1E shows a sectional exploded view of the fitting in FIG. 1B.

With reference to the cited figures, reference numeral 1 indicates as a whole a fitting for connecting pipes T, in particular flexible pipes, according to the present invention. In general, the same reference number is used for identical or similar elements, optionally in their embodiment variants.

The fitting 1 is used for mutually connecting pipes T used for transporting pressurized fluids. Such pipes T can be either of the type made of a single material (for example rubber or plastic), or of the so-called "multilayer" type (as shown in FIGS. 11, 12, 13, 13A). Multilayer pipes T are, for example, pipes containing overlapping layers of different materials and in which, specifically, one or more of these layers is made of metal material.

For example, as shown in FIGS. 11, 12, 13, 13A, the multilayer material can comprise three overlapping layers T1, T2 and T3 (preferably glued together by means of intermediate adhesive layers); preferably, the external T1 and internal T3 layers are made of plastic and the intermediate layer T2 is made of a metal material (for example aluminum).

With reference to the exemplary, non-exclusive embodiment shown in the figures, the fitting 1 comprises a first tubular element (or end portion) 3 and a second tubular element (or end portion) 4 respectively provided with a first 3a and a second 4a inlet/outlet opening and respectively defining, at the interior thereof, a first 3b and a second 4b duct. The two tubular elements are connected to each other at respective opposite ends to the respective inlet/outlet opening, in a manner such that the first $3b$ and second $4b$ ducts are in communication with each other and overall define a joint duct 2 of the fitting placing said first $3a$ and second $4a$ opening in fluid communication.

As can be seen in the figures, the first tubular element 3 is provided with at least one through opening 20, between an external surface 6 of the first tubular element 3 facing outwards and an internal surface 7 of the first tubular element 3 directed towards, and defining, the aforesaid first duct $3b$.

Within the scope of the present description and claims, "through opening" generally means a notch or a hole, a socket or a slot or a hole in the first tubular element 3: the opening can have varying shape and dimensions according to the embodiment, the dimensions of the fitting and the intended use, and it is through from the exterior to the interior of the tubular element.

The through opening 20 defines a respective empty space 21 between the external surface 6 and the internal surface 7 of the first tubular element 3. The term empty space means a lack of material in the first tubular element, i.e. an "emptying" or removal; substantially, the empty space created by the through opening defines a seat destined—as illustrated below—to be filled with material belonging to the pipe to be connected by the fitting.

The fitting 1 is configured for operating in an insertion condition, in which it allows a pipe T to be fitted around said first tubular element 3, and in a clamping condition, in which the pipe is pressed and stably locked, in a fluid-tight manner, on the first tubular element 3.

In the aforesaid clamping condition, the empty space 21 defined by the through opening 20 is configured to be occupied by a portion of the pipe T pressed on the first tubular element 3. The pressing of the pipe T in the annular housing and the penetration of part of the material of the pipe itself into the empty spaces defined by the through openings is illustrated by way of example in FIGS. 12, 13 and 13A.

Preferably, the fitting 1 is further provided with at least one first bushing 11 associable, preferably in a removable manner, with the first tubular element 3 in a manner such to externally surround it and to create, between the bushing itself and the first tubular element, an annular housing 12 destined to insertingly receive a pipe T; upon insertion, such pipe is interposed between the first tubular element and the bushing. The bushing has an internal surface $11a$, directed towards the first tubular element 3, and an external surface $11b$.

The external surface 6 of the first tubular element is directed towards the first bushing 11. The first bushing 11 is configured for operating in an insertion configuration, when the fitting is in said insertion condition, in which it allows the insertion of the pipe T in the annular housing 12, and a clamping configuration, when the fitting is in said clamping condition, in which it presses and stably locks, in a fluid-tight manner, the pipe in the annular housing. In the clamping configuration, the empty space 21 is occupied by a portion of the pipe T due to the pressure of the first bushing 11 on the first tubular element 3.

More in detail, the passage of the first bushing 11 from the insertion configuration (FIG. 11) to the clamping configuration (FIG. 13) occurs by means of a radial deformation of the bushing 11 itself, in moving closer to the first tubular element 3, such to compress the pipe T between the bushing and the first tubular element within the annular housing 12.

Such deformation is made by acting on the external surface $11b$ of the bushing with a pinching profile P1 of a clamping gripper P (shown in FIG. 12), capable of plastically deforming the bushing.

In other words, the passage of the bushing 11 into the clamping configuration causes a reduction of the radial extension of the annular housing 12, caused by the approaching of the bushing 11 to the first tubular element 3, and a consequent compression of the pipe T within the annular housing.

Preferably, the first tubular element 3 has a substantially hollow cylinder shape with a first longitudinal extension axis X and the material that constitutes the first tubular element 3 has a substantially constant section (or thickness); the external surface 6 of the first tubular element 3 defines a first diameter with respect to the first longitudinal extension axis X.

Preferably, the aforesaid empty space 21 lacks the material constituting the first tubular element 3 at least at the section of the first tubular element. Therefore, the seat defined by the empty space 21 is considered at least on the section, or thickness, of the first tubular element 3.

It should be noted that the most relevant technical feature underlying the present invention is the presence of said at least one through opening in the tubular element, which defines the empty space that is occupied by a portion of the pipe when it is pressed. As is known, the pressing occurs by means of a mechanical tool (the aforesaid gripper P), which has the purpose of deforming the pipe so that it mechanically locks to the fitting, preventing it from being unthreaded/removed. The fitting of the present invention allows—with the through openings and empty spaces—to provide effective anchoring means for the pipe once pressed. The presence of the bushing allows to optimize the coupling operations of the pipe to the fitting, since the plastic deformation of the bushing (due to the pressing by the gripper P) determines a pressure on the pipe, with consequent compression of the pipe in the annular housing and penetration of material of the pipe in the empty spaces 21, and moreover such pressure persists over time preventing the unthreading/removal of the pipe even after some time. However, it is not strictly necessary for the bushing to be present, since the pressing of the pipe could occur—by the gripper P—also directly on the external surface of the pipe (not inserted in an annular housing when the bushing that defines it is not present), causing it to stably deform (partially penetrating the empty spaces) and then anchor to the fitting. Such embodiment of the fitting without a bushing can be implemented, for example, in the case of multilayer pipes T (as shown by way of example in FIGS. 11-13) in which the intermediate layer T2 in metal material (for example aluminum) has a thickness sufficient to ensure—once pressed—a stable deformation of this layer T2 and a consequent penetration of the underlying internal layer T3 into the spaces 21 defined by the through openings 20.

In a first set of possible embodiments, for example as shown in FIGS. 1A-1E, 4A-4C, 6A-6C and 8A-8C, said at least one through opening 20 is made by notching and removing the material that constitutes the first tubular element 3.

Preferably, the through opening has a specific closed polygonal form, e.g. rectangular, circular, square, triangular.

Preferably, the through opening has an edge 22 corresponding with the specific closed polygonal form.

Preferably, the empty space 21, defined by the through opening 20, corresponds with the section portion of the first tubular element 3 from which the material was removed, by means of the notching that makes the through opening.

In a second set of possible embodiments, for example as shown in FIGS. 2A-2C, 5A-5C, 7A-7C, 9A-9C and 10A-10C said at least one through opening 20 is made by means of executing a through cut (for example, by shearing or cutting) in the material that constitutes the first tubular element 3, where the aforesaid through cut has a specific profile 23 or boundary, and with a bending of part of the material identified by the profile 23 of the cut, preferably towards the interior of the first tubular element 3, i.e. towards the first longitudinal extension axis X within the first duct 3b.

The profile 23 of the through cut has a specific form, preferably C-shaped, U-shaped or with jagged (broken) line formed by one or more consecutive segments.

In the exemplary figures, the broken line is substantially U-shaped, with the intermediate segment having a greater length than the two lateral segments (orthogonal to the central segment).

Preferably, the broken line is an open broken line. Preferably, the broken line is a simple or non-self-intersecting broken line.

Preferably, as for the second set of embodiments, the through opening 20 has an edge, on the external surface 6 of the first tubular element 3, corresponding with the aforesaid profile 23 of the through cut.

Preferably, the empty space 21, defined by the through opening 20, corresponds with the section portion of the first tubular element 3 from which the material was removed, by means of the notching that makes the through opening (FIGS. 1A-1E, 4A-4C, 6A-6C and 8A-8C) or by means of the cutting and subsequent bending of the material identified by the profile of the cut (2A-2C, 5A-5C, 7A-7C, 9A-9C and 10A-10C).

Preferably, the material identified by the cut profile defines, following said bending, a tooth 24 that is bent with respect to the hollow cylindrical extension of the first tubular element 3, preferably towards the interior of the first duct 3b. In this way, the tooth does not occupy the annular housing 12 between the tubular element 3 and the bushing 11, leaving it free to insertingly receive the end of the pipe T to be connected.

Preferably, as shown by way of example in FIGS. 2A-2C, 5A-5C, 7A-7C, 9A-9C and 10A-10C, the profile 23 of the cut is arranged on the first tubular element 3 in a manner such that the tooth 24 is bent with a free terminal end thereof (defined by the cut profile) directed towards the end of the first tubular element corresponding to the first inlet/outlet opening 3a (i.e. towards the exterior of the fitting).

Figure 3C:
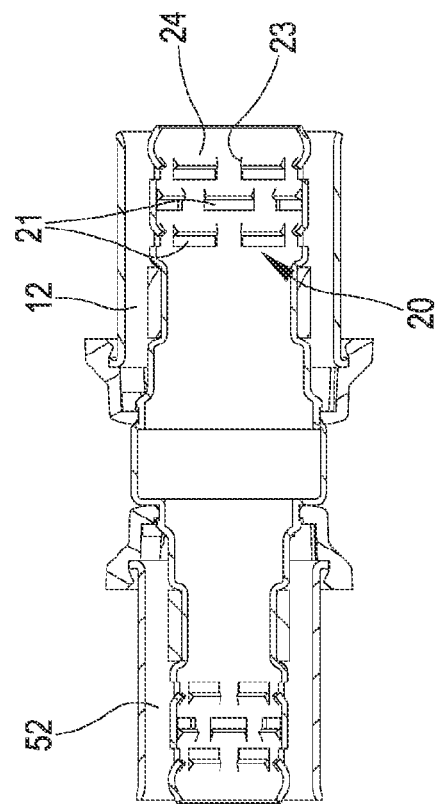
FIG. 3C shows a sectional view of the fitting in FIG. 3B.
Figure 3B:
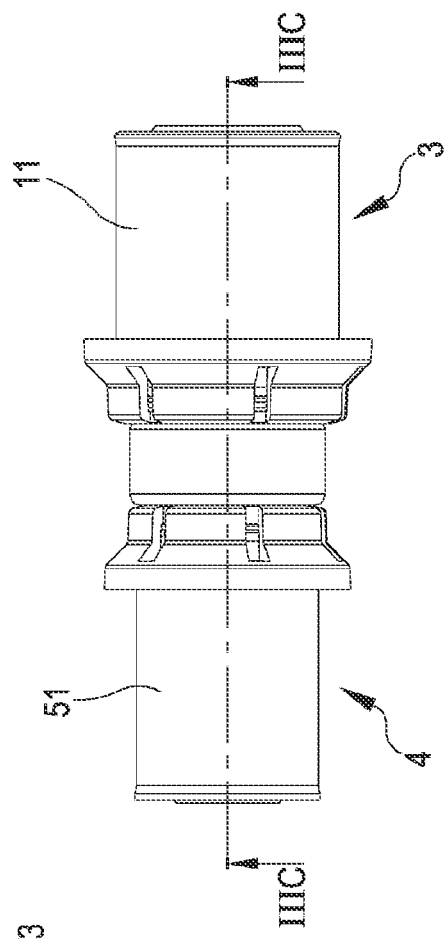
FIG. 3B shows a side view, with no parts removed, of the fitting in FIG. 3A.
Figure 3A:
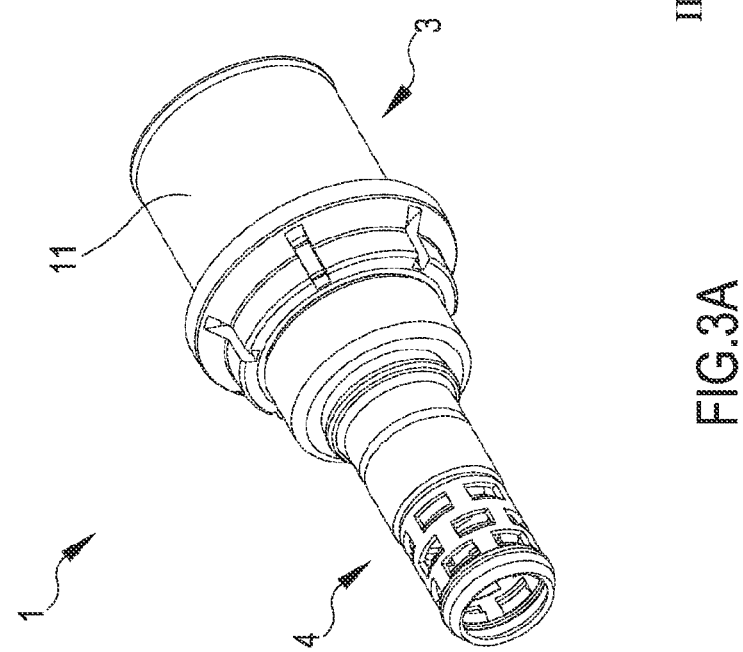
FIG. 3A shows a perspective view of a further possible embodiment of a fitting for connecting pipes according to the present invention, with some parts removed.
Figure 4B:
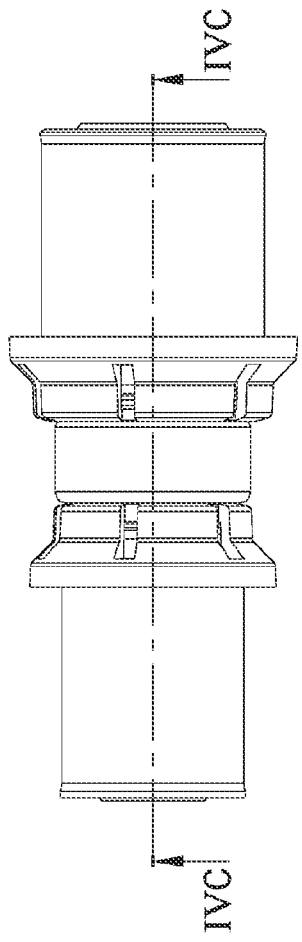
FIG. 4B shows a side view, with no parts removed, of the fitting in FIG. 4A.
Figure 4C:
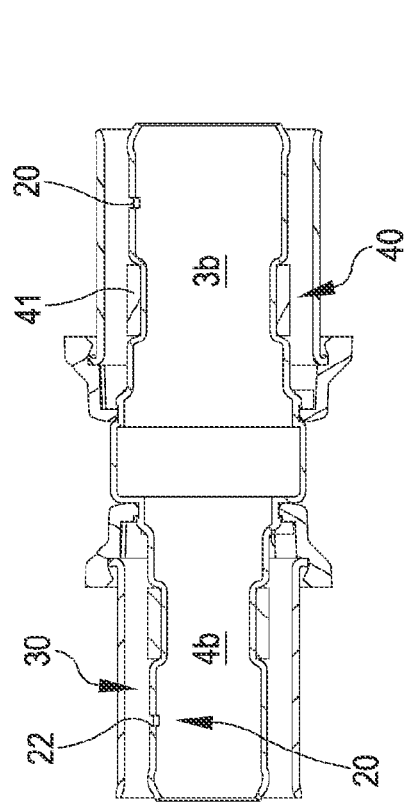
FIG. 4C shows a sectional view of the fitting in FIG. 4B.
Figure 4A:
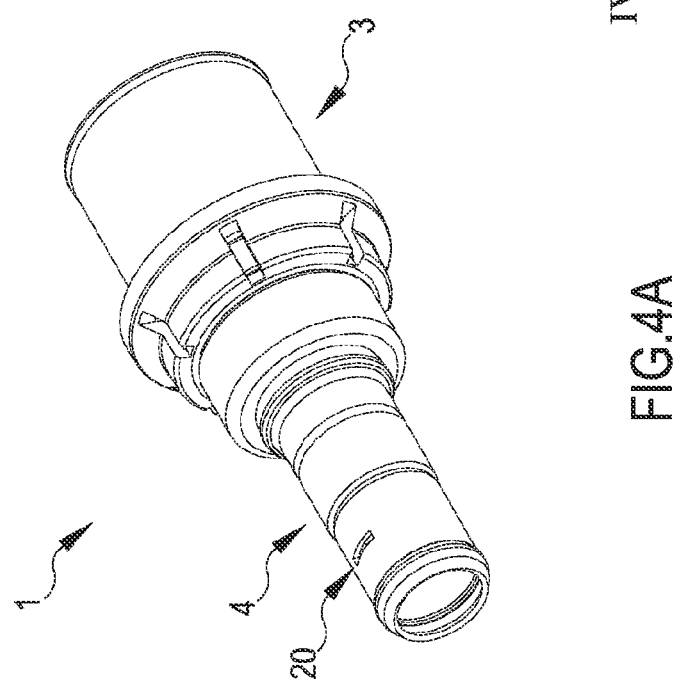
FIG. 4A shows a perspective view of a further possible embodiment of a fitting for connecting pipes according to the present invention, with some parts removed.
Figure 6C:
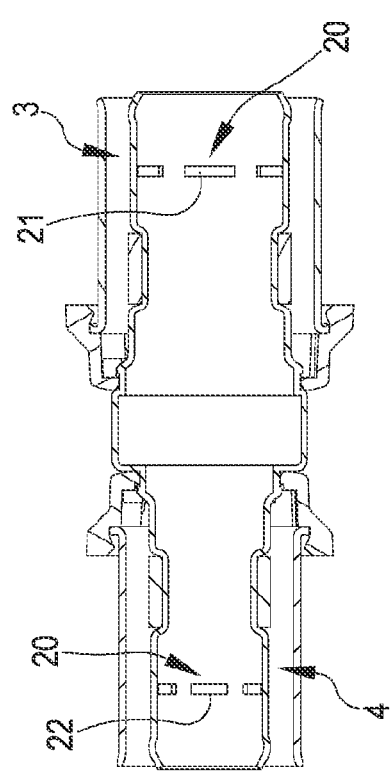
FIG. 6C shows a sectional view of the fitting in FIG. 6B.
Figure 6B:
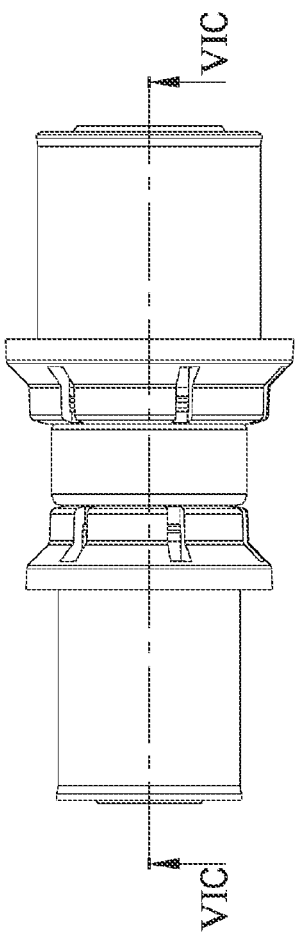
FIG. 6B shows a side view, with no parts removed, of the fitting in FIG. 6A.
Figure 6A:
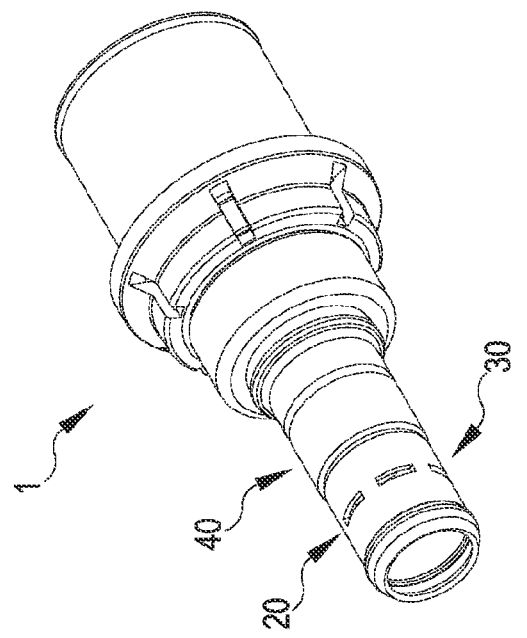
FIG. 6A shows a perspective view of a further possible embodiment of a fitting for connecting pipes according to the present invention, with some parts removed.
Figure 7C:
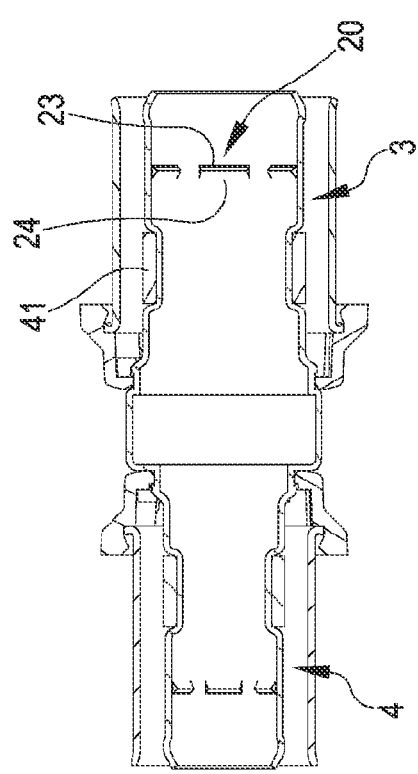
FIG. 7C shows a sectional view of the fitting in FIG. 7B.
Figure 7B:
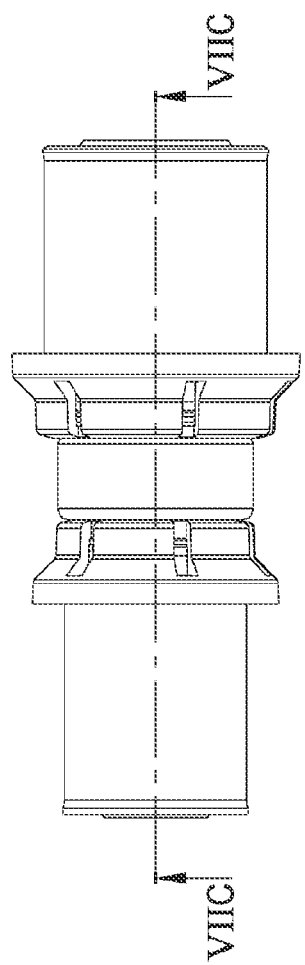
FIG. 7B shows a side view, with no parts removed, of the fitting in FIG. 7A.
Figure 7A:
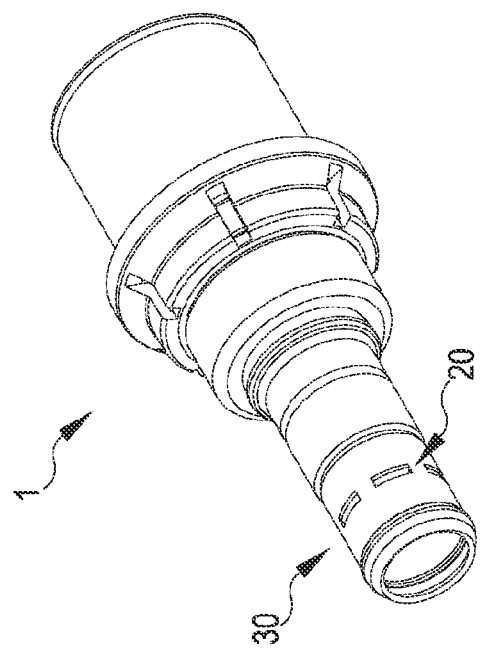
FIG. 7A shows a perspective view of a further possible embodiment of a fitting for connecting pipes according to the present invention, with some parts removed.
Figure 11:
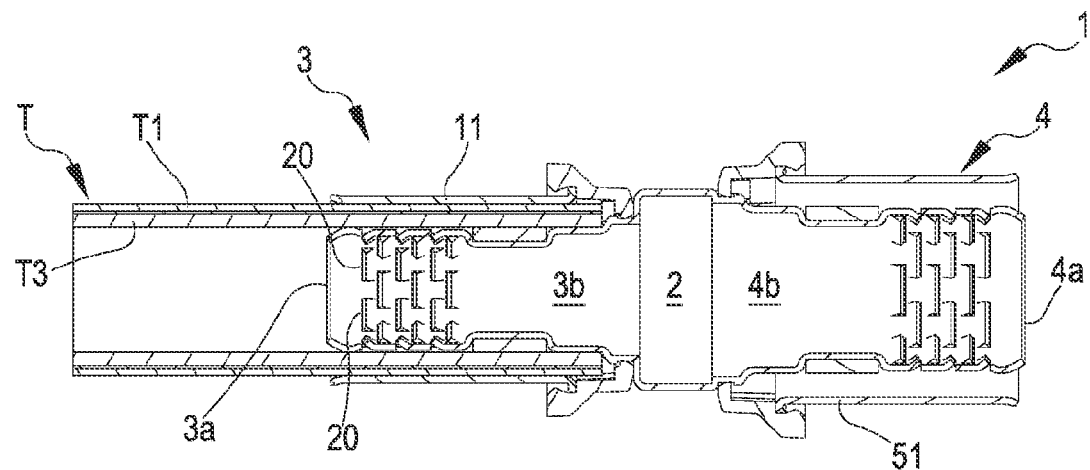
FIG. 11 shows a sectional view of the fitting in FIG. 2A in which a multilayer pipe is inserted (insertion condition)
Figure 12:
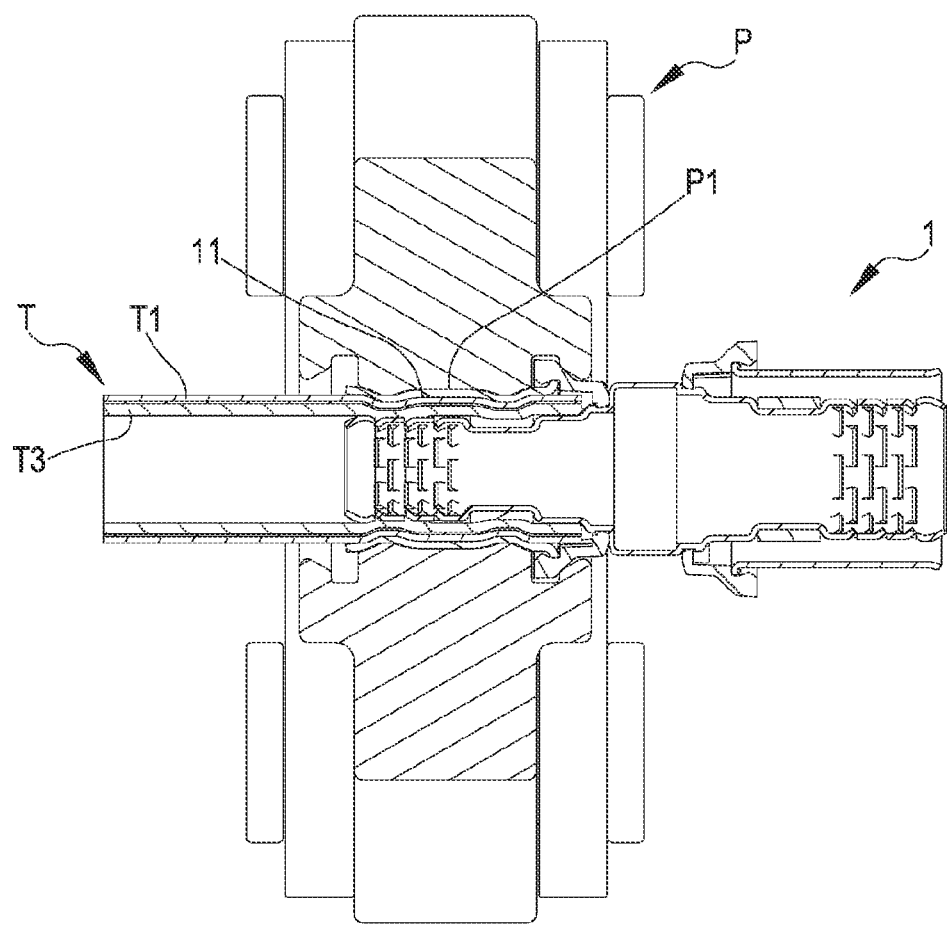
FIG. 12 shows the fitting in FIG. 11 during the operation of clamping the multilayer pipe (passage from the insertion condition to the clamping condition)
Figure 13:
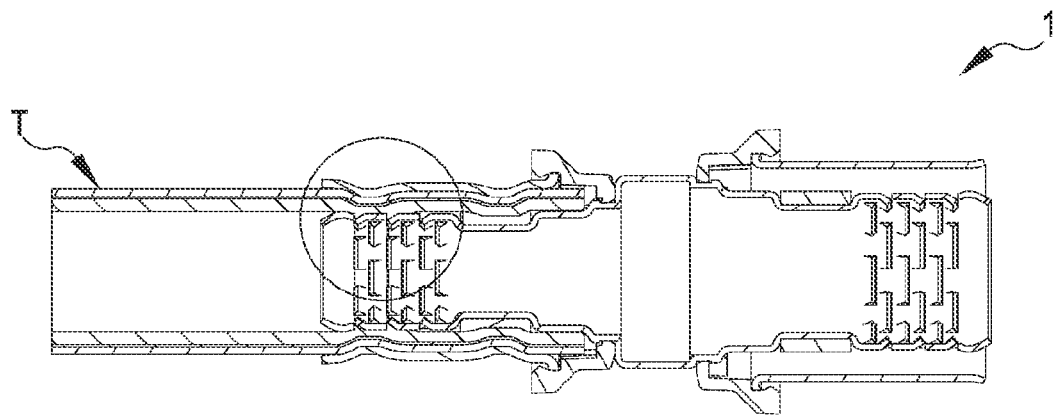
FIG. 13 shows the fitting in FIGS. 11 and 12 with the multilayer pipe mounted thereto, at the end of the clamping operations (clamping condition)
Figure 13A:
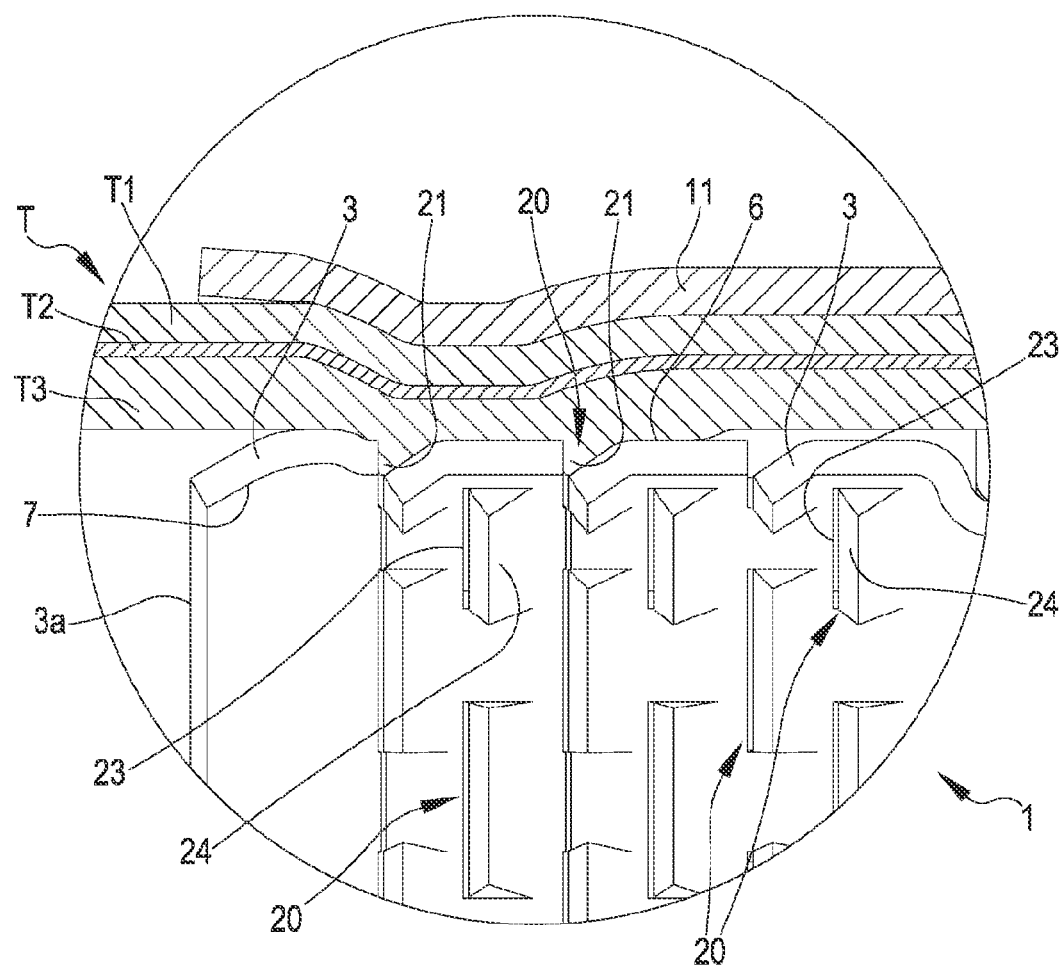
FIG. 13A shows an enlargement of a portion of the view in FIG. 13.

In an alternative aspect, shown by way of example in FIGS. 3A-3C, the cut profile 23 is arranged on the first tubular element 3 in a manner such that the tooth 24 is bent with a free terminal end thereof (defined by the cut profile) directed in an opposite direction with respect to the end of the first tubular element corresponding to the first inlet/outlet opening 3a (i.e. towards the central part of the fitting).

Preferably, the specific form of the through opening 20 constitutes a perimeter with a sharp corner on the external surface 6 of the first tubular element 3.

Preferably, in the same way, the specific profile 23 of said through cut constitutes an edge with a sharp corner on the external surface 6 of the first tubular element 3.

If the tooth 24 is directed in an opposite direction with respect to the first inlet/outlet opening (FIGS. 3A-3C), a sharp corner edge in the unthreading/removing direction of the pipe is avoided, i.e. a sharp corner edge is prevented from being present and contacting the material of the pipe inserted in the annular housing (which, in certain stress conditions, also depending on the pipe material, may shear the pipe material and notch it or remove a part thereof).

In general, the direction of creation of the tooth can be selected as desired, based on the type of fitting to be made and the intended use.

In a possible embodiment, shown by way of example in FIGS. 3A-3C and intermediate with respect to the preceding ones, the through opening 20 is made, in a first portion thereof, by notching and removing the material which constitutes the first tubular element 3, and in a second portion by means of executing a through cut (shearing, cutting) in the material that constitutes the first tubular element and with a bending of part of the material identified by the profile of the cut. Such first portion and second portion are joined together, i.e. seamlessly adjacent, so as to form a single joint empty space. Substantially, in this embodiment, a part of the material is removed during the creation of the through opening, and a part is instead cut and bent to create a tooth. In other words, this embodiment combines the two preceding ones, which involve—for making the through opening 20—removing the material or cutting and bending it towards the interior of the duct.

Preferably, the first tubular element 3 has an external diameter, at the external surface 6, and the empty space 21 extends from such diameter towards the interior of the first tubular element, i.e. towards the first longitudinal extension axis X.

A set of possible embodiments of the fitting according to the present invention are now reviewed.

In a possible embodiment, the first tubular element is provided with a pair of through openings 20, preferably arranged in diametrically opposite positions with respect to each other.

In possible preferred embodiments, the first tubular element 3 is provided with a plurality of through openings 20, preferably identical to each other, made in different positions on the external surface 6 of the first tubular element.

In a possible embodiment, shown by way of example in FIGS. 6A-6C and 7A-7C, the plurality of through openings 20 comprises a series of through openings side-by-side each other to form an annular distribution around the external surface 6 of the first tubular element, said annular distribution preferably being centered on the first longitudinal extension axis X. In other words, the plurality of through openings is distributed over a circumference centered on the first longitudinal extension axis.

In a possible embodiment, shown by way of example in FIGS. 8A-8C and 9A-9C, the plurality of through openings 20 comprises a series of through openings aligned with each other to form a linear distribution along the external surface 6 of the first tubular element 3, said linear distribution preferably being aligned parallel to the first longitudinal extension axis X.

In a possible embodiment, the plurality of through openings comprises two of said series of through openings aligned with each other to form a linear distribution, the two series being located in diametrically opposite portions of the first tubular element.

In a possible embodiment, the plurality of through openings comprises a series of through openings side-by-side each other to form a curvilinear distribution around the external surface of the first tubular element.

In a possible embodiment, the plurality of through openings comprises a set of through openings side-by-side each other so as to occupy an entire sector of the external surface of the first tubular element.

In a possible embodiment, the plurality of through openings comprises a set of through openings side-by-side each other so as to occupy a cylindrical portion of the external surface of the first tubular element.

In a possible embodiment, shown by way of example in FIGS. 1A-1E, 2A-2C, 3A-3C and 10A-10C, in the set of through openings side-by-side each other and occupying a cylindrical portion of the external surface of the first tubular element, the through openings are offset with respect to each other so as to attain a grid-like distribution or a network of through openings.

Optionally, the plurality of through openings can comprise a set of through openings occupying the entire external surface of the first tubular element.

Preferably, each through opening 20 can be oriented in any way with respect to the first longitudinal extension axis, i.e. each through opening has its own edge 22 oriented or positioned as desired on the external surface 6 of the first tubular element 3.

According to a possible preferred embodiment, implemented in all the fittings shown in the figures, the first tubular element 3 comprises:
  a locking portion 30, which comprises the aforesaid at least one through opening 20 or the plurality of through openings 20 and is configured for allowing, when the first bushing 11 is in said clamping configuration, the stable connection of the pipe T inserted in the annular housing 12, and preventing the unthreading/removal of the pipe from the fitting;
  a seal portion 40, which comprises at least one seal element 41 externally wound around the first tubular element 3 in a manner such that the seal element 41 is interposed between the seal portion 40 of the tubular element 3 and the pipe T inserted in the annular housing, preventing the leakage of fluid between the first duct and the exterior of the fitting.

Preferably, the seal element 41 is a gasket or an O-ring.

Preferably, the seal element 41 has an annular or toroidal or cylindrical hollow or band conformation.

Preferably, the seal element is externally wound around the first tubular element 3, in a suitable annular seat 42 of the seal portion 40, so as to be substantially flush with an external diameter of the first tubular element 3.

Alternatively, the seal element can be externally wound around the first tubular element 3, in said annular seat 42, so as to protrude externally from the external surface 6 of the first tubular element. In such case, the seal element has a larger diameter than said external diameter of the first tubular element 3. Such embodiment is capable of providing a fluid seal already following the simple insertion of the pipe T into the annular housing 12; in addition, the seal element can then be further deformed together with the pipe itself, following the compression of the bushing, so as to adhere more effectively both to the tubular element and to the pipe fitted thereto, preventing leakage of fluid towards the exterior even in conditions of high operating pressures.

Preferably, the locking portion 30 has a cylindrical shape and the seal portion 40 has a respective cylindrical shape.

Preferably, the locking portion 30 and the seal portion 40 are arranged in succession one after the other along a direction coinciding with the first longitudinal extension axis X.

Preferably, the locking portion 30 is extended starting from the first inlet/outlet opening 3a, and the seal portion 40 is positioned downstream of the locking portion along the first longitudinal extension axis X (with respect to the first inlet/outlet opening).

Preferably, the seal portion 30 is positioned on the opposite side of the locking portion 40 with respect to the side where the first inlet/outlet opening 3a is positioned. In other words, the locking portion 40 is interposed, along the longitudinal extension, between the first inlet/outlet opening 3a and the seal portion 30.

Preferably, the locking portion 30 ends in or leads to the first inlet/outlet opening 3a.

Preferably, the locking portion 30 and the seal portion 40 are in succession one after the other in the first tubular element 3, and are continuously extended with respect to each other to form a first joint tubular element.

In a possible embodiment, not shown, the seal portion can be provided with one or more of said through openings, located below the seal element.

Preferably, with the pipe T inserted in the annular housing 12 and with the bushing 11 in the clamping configuration, the locking portion 30 achieves a mechanical seal of the pipe to the fitting, and the seal portion 40 achieves a hydraulic seal.

The fitting, as in the embodiments from FIG. 1 to FIG. 9, can have a linear (or rectilinear) conformation, and the first tubular element 3 has the longitudinal extension axis X coinciding with the longitudinal extension axis Y of the second tubular element 4.

In a possible embodiment, shown by way of example in FIGS. 10A-10C, the fitting has a curved or angular conformation, in which the respective longitudinal extension axes X and Y of the first 3 and second 4 tubular elements form an angle different from 180°, for example 45° or 90°, with respect to each other. In such configuration, the first and second longitudinal extension axes are skewed and can intersect inside the fitting, in a transition portion of the fitting from the first to the second tubular element, or outside the body of the fitting.

In a further possible embodiment, not shown, the fitting can be T-shaped and comprises three tubular elements, two external tubular elements being aligned with each other and a third intermediate tubular element being interposed between the two external tubular elements and perpendicular thereto.

Preferably, the first bushing 11 has a hollow cylinder shape and has a longitudinal extension axis coinciding with the first longitudinal extension axis X.

Preferably, the internal surface 11a of the first bushing 11 is substantially cylindrical and/or has constant diameter along the entire extension of the first bushing along the first longitudinal extension axis.

Preferably, the seal element 41 of the seal portion 40 of the first tubular element 3 is deformable, when the first bushing 11 is in the clamping configuration, in order to prevent a fluid communication between the first duct and an external surface of the first tubular element.

Preferably, the seal portion 40 of the first tubular element 3 can comprise a further seal element, substantially identical to said seal element, externally wound around the first tubular element in a different position along the longitudinal extension axis.

Preferably, the bushing 11 has a thickness, calculated as the distance between the internal surface 11a and the external surface 11b, which is substantially even along its entire longitudinal extension.

Preferably, the first tubular element 3 lacks ribs externally to the external surface of the tubular element itself.

Preferably, the edge 22 of the through opening 20 defines a grip for the pipe T when the first bushing 11 is in the clamping configuration.

Preferably, as in the embodiments shown in the figures, the fitting 1 comprises a second bushing 51 associated with the second tubular element 4 in a manner such to externally surround it and to create, between the bushing itself and the second tubular element, a respective annular housing 52 destined to insertingly receive a respective pipe, such pipe being interposed between the second tubular element and the second bushing; the second bushing 51 has an internal surface 51a, directed towards the second tubular element 4, and an external surface 51b.

Preferably, the second bushing 51 is identical to the first bushing 11 and/or is provided with one or more of the features described in the aspects and/or claims with reference to the first bushing 11.

Advantageously, depending on the intended use of the fitting, the diameter of the first tubular element and of the second tubular element can be the same or different, as well as the diameters of the first bushing and of the second bushing. In the embodiments of the figures, the diameters of the two tubular elements are shown, by way of example, different from each other.

Preferably, the second tubular element 4 is provided with at least one respective through opening 20, between an external surface of the second tubular element directed towards the second bushing 51 and an internal surface of the second tubular element directed towards, and defining, said second duct 4b. The respective through opening 20 defines a respective empty space 21 between the external surface and the internal surface of the second tubular element 4. The second bushing 51 is configured for operating at least in an insertion configuration, in which it allows the insertion of a respective pipe in the annular housing 52, and a clamping configuration, in which it presses and stably locks, in a fluid-tight manner, the pipe in the annular housing. In the clamping configuration, the empty space 21 defined by the respective through opening 20 is configured to be occupied by a portion of the respective pipe pressed between the second bushing 52 and the second tubular element 4.

Preferably, the second tubular element 4 is structurally identical to the first tubular element 3 and/or it is provided with one or more of the features described in the aspects and/or claims with reference to the first tubular element.

Preferably, the first 3 and the second 4 tubular element make a fitting 1 for connecting two pipes, wherein the means present on the first tubular element are the same present, in an entirely specular or corresponding manner, on the second tubular element.

Preferably, the first tubular element 3 and the second tubular element 4 are made in a single piece.

Preferably, the fitting 1 is made in a single piece, with the exception of the first bushing 11 and said second bushing 51 (and with the exception of the bushing holder elements and the seal elements).

As an alternative to the specular configuration of the first and second tubular elements, in a possible embodiment (not shown) the second tubular element comprises connection means for a fluid source, for example a duct, a tap or a tank. Preferably, said connection means comprise a threaded portion intended to connect to a corresponding reverse thread of said fluid source for placing said second tubular element in fluid communication with the fluid source.

Preferably, the first tubular element 3 has, at the opposite end to the first inlet/outlet opening 3a, an abutment portion 3c having a larger diameter than the external surface 6 of the first tubular element itself and adapted to define an abutment surface for a pipe T fitted on the tubular element. Such abutment element has a radial dimension greater than the external surface of the first tubular element, measured away from the longitudinal extension axis X.

Preferably, the fitting comprises a first bushing holder 16 (preferably different from bushing 11) associable, in a removable manner, with the first tubular element; such bushing holder 16 is configured to mount the bushing 11 on the first tubular element 3 in a manner such that the bushing stably surrounds the first tubular element and defines the annular housing 12. Preferably, the bushing holder 16 has an annular shape and, when associated with the mounting portion, it has a central axis coinciding with the longitudinal extension axis X.

Preferably, the bushing holder is extended along said central axis between a first annular coupling end to the first tubular element and a second annular coupling end adapted to receive the bushing. Preferably, mounting the bushing (associated to its bushing holder) on the tubular element 3 occurs "by snap coupling", by means of the insertion of the first annular coupling end in a cavity defining a mounting portion.

The bushing holder 16 can preferably comprise one or more openings 18 formed in one or more circumferential and through positions of the bushing holder between the exterior and the interior of the bushing holder; such openings (defining as a whole a "window" around the bushing holder) are suitable for allowing to see (from the exterior of the bushing) the pipe T inserted in the housing 12 in order to verify the correct positioning of the pipe before proceeding to the its clamping within the fitting.

The fitting 1 can comprise a second bushing holder 56, for example identical to the first bushing holder, intended for the second bushing 51.

Preferably, in a possible embodiment of the invention (not shown), the fitting comprises a plurality of tubular elements in fluid communication with each other, it being possible for a respective pipe to be fitted on each of these tubular elements, each tubular element being preferably identical to the aforesaid first or second tubular elements.

Preferably, the first 3 and/or the second 4 tubular element are made of a metal material, preferably steel, or brass (for example yellow brass CW602N), or again of a plastic material (for example PPSU technopolymer).

As an example, the first 3 and the second 4 tubular element are made by means of a steel pipe having a thickness of about 1 mm, or comprised between 0.5 mm and 1.5 mm.

Preferably, the bushing 11 is made of a metal material, preferably steel (for example AISI 304 stainless steel).

Preferably, the seal elements are made of rubber (for example, EPDM—Ethylene-Propylene Diene Monomer synthetic rubber). Preferably, the pipe T is made of a plastic material or, alternatively, it is a multilayer pipe comprising an external layer T1 in a plastic material, an intermediate layer T2 in a metal material and an internal layer T3 in a plastic material.

The fitting object of the present invention complies with the regulations for use with drinking water. As an example, the maximum operating temperature can be 150° C. in continuous operation and the maximum operating pressure is 10 bar.

The bushings 11 and 51 in accordance with the present invention are configured to be clamped by means of grippers having a type B or type F or type H or type TH or type U or other pinching profile, with reference to the pinching standards for fittings known in the hydraulic field. The bushing is substantially shaped in a manner such that with each of these grippers the deformation is of the right extent, that is, neither insufficient (in which case seal problems would occur) nor excessive (in which case the pipe could be damaged).

The method for making a fitting according to the present invention comprises the steps of:
- arranging the first tubular element 3 provided, at one end thereof, with the first inlet/outlet opening 3a and at its interior defining the first duct 3b;
- arranging the second tubular element 4 provided, at one end thereof, with the second inlet/outlet opening 4a and at its interior defining the second duct 4b;
- arranging the first bushing 11;
- making said at least one through opening 20 between the external surface 6 and the internal surface 7 of the first tubular element 3;
- mounting the first bushing on the first tubular element 3.

In one aspect, the steps of arranging the first tubular element 3 and arranging the second tubular element 4 involve making both tubular elements 3 and 4 starting from a single metal pipe, preferably made of steel, with which the first tubular element and the second tubular element are defined—in a single piece—, said metal pipe being subjected to forming and/or bending operations.

Preferably, in the step of making at least one through opening, said at least one through opening is made by means of a notching and removal operation the material that constitutes said first tubular element.

Preferably, the notching and removal of the material occurs by means of a shearing or punching or laser, waterjet, plasma, cold, oxy-fuel cutting operation.

In an alternative aspect, in the step of making at least one through opening, said at least one through opening is made by carrying out two operations:
- a through cut in the material that constitutes the first tubular element, said through cut having a specific profile or boundary; and
- a bending of part of the material identified by the profile of said cut, preferably towards the interior of the first tubular element.

Preferably, the through cut occurs by means of a shearing or cutting operation and the bending occurs by means of a plastic deformation of at least part of the material identified by the cut profile.

Preferably, the shearing or cutting step and the plastic deformation step can be performed simultaneously by means of a single operation.

Preferably, the step of making at least one through opening occurs with no mechanical turning or milling operations.

Preferably, the method comprises, preferably before the mounting step of the first bushing on the first tubular element, the step of arranging at least one seal element and externally winding it around the first tubular element in a manner such that the seal element is interposed between the first tubular element and a pipe inserted in the aforesaid annular housing.

Preferably, the method comprises, prior to the mounting step of the first bushing on the first tubular element, a step of arranging a bushing holder associable, in a removable manner, with the first tubular element, the bushing holder being configured for receiving the first bushing and mounting it on the first tubular element in a manner such that the first bushing stably surrounds the first tubular element and defines the annular housing.

Preferably, the method comprises the step of inserting one end of a pipe to be connected to the fitting in the annular housing, in a manner such that the pipe is fitted on the first tubular element and partially surrounded by the first bushing.

In one aspect, the method comprises the step of exerting on the external surface of the first bushing, preferably by means of a pinching profile of a clamping gripper, a clamping force capable of radially, preferably plastically, deforming said first bushing, in moving closer to the first tubular element, in such a way as to compress the pipe between the first bushing and the first tubular element within the annular housing and stably lock, in a fluid-tight manner, the pipe in the annular housing itself.

In one aspect, during the step of exerting a clamping force on the external surface of the first bushing, said at least one seal element is deformed in manner such as to inhibit a fluid communication between the first duct and the external surface of the first tubular element.

In one aspect, the method comprises the steps of:
- arranging a second bushing having a hollow cylinder shape and having a respective longitudinal extension axis;
- making at least one through opening between an external surface of the second tubular element directed towards said second bushing and an internal surface of the second tubular element directed towards, and defining, said second duct, in a manner such that said through opening defines a respective empty space between the external surface and the internal surface of the second tubular element;
- mounting said second bushing on the second tubular element so as to externally surround it and to create, between the internal surface of the second bushing itself and the second tubular element, an annular housing destined to insertingly receive a further pipe, such further pipe being interposed between the second tubular element and the second bushing.

The method may comprise the step of arranging, on the first or second tubular element, connection means for a fluid source, for example a duct, a tap or a tank. Such connection means may comprise a threaded portion intended to connect to a corresponding reverse thread of said fluid source for placing the tubular element in fluid communication with the fluid source.

The invention thus conceived is subject to numerous modifications and variants, all falling within the scope of the inventive concept, and the components cited herein may be replaced by other technically equivalent elements.

The invention therefore achieves important advantages. First of all, as is clear from the above description, the invention allows to overcome at least some of the drawbacks of the prior art.

In greater detail, the described fitting, and the manufacturing method thereof, overcome the drawbacks described for known solutions, in particular the drawbacks of both brass fittings, of the type described in the patent EP2677223, and mixed steel-plastic fittings, illustrated above.

In fact, the presence of the through openings, in the locking portion, allows to ensure an effective and safe mechanical seal directly on the tubular element, without the need for a complex and thick structure (typically in brass and provided with ribs), as is the case of patent EP2677223, and without the need for additional cylinders externally wound to the end portion, in order to provide the fitting with external protrusions on which to anchor the pipe (as for mixed steel-plastic fittings).

The fitting according to the present invention is provided with innovative means (the through openings) made on the fitting itself and capable of stably anchoring the flexible pipe to the termination.

In this way, it is possible to obtain a fitting characterized by reduced cost, in particular compared to the cost of the known solutions, while ensuring the necessary performance and the correct connection of pipes to the fitting.

For example, it is possible to make the fitting of the present invention starting from a simple metal pipe, having reduced cost and weight, without providing additional gripping parts (such as the cylinders with protrusions of known solutions, which must be co-molded to a smooth metal pipe) or complex mechanical machining (necessary to make the ribs in known brass fittings). The construction of the locking means, i.e. the creation of the through openings, is also technologically very simple and rapid.

In addition, since the through openings are made directly on the tubular elements (the end portions), thus removing material to create the empty spaces that accommodate part of the material of the pipe once inserted and pressed, it is not necessary to provide for an excess thickness in the starting pipe from which the fitting is made. On the contrary, the tubular elements (end portions) of the fitting of the present invention can have a substantially constant internal diameter and a very small thickness.

Furthermore, the solution of the present invention allows to obtain optimized fittings also in the case of angular configurations: making it possible to make the fitting starting from a simple thin pipe (preferably of metal) and carrying out simple bending and shearing operations of the through openings, the bend between the two openings of the fitting, which are inclined with respect to each other, is very soft and does not introduce phenomena of pressure drop or turbulence. In any type of embodiment, the fitting according to the present invention is capable of transporting fluid with a flow which is as even and laminar as possible.

Overall, all this allows to significantly reduce the pressure drops and increase the useful diameter of the internal duct and therefore the flow rate, as well as to limit the turbulence in the transported fluid: overall these improvements result in a very low "zeta value", and lower than known solutions, and therefore optimal since it shows low hydraulic resistance.

In addition, the further problem of mixed steel-plastic solutions is also avoided, which consists in the risk that a leakage occurs between the external plastic cylinder and the respective steel termination: in fact, in the fitting of the present invention, the locking portion does not have additional means with the exception of the pipe itself, on which the through openings are directly made.

Overall, the fitting of the present invention is characterized by a high reliability of operation and lower potential for failures or malfunctions.

The fitting of the present invention can advantageously be made of various materials (steel, brass, aluminum, plastic, etc.), and the manufacturing method is very fast, in particular with respect to known solutions.

It should be noted that the technical solution underlying the present invention is particularly innovative when compared with known solutions: the latter always involve the addition of ribs or external protrusions to the diameter of the end portion that receives the pipe to be connected, with the end portion never being drilled in the anchoring part. On the contrary, the present invention involves creating—through the through openings—empty spaces in the thickness of the end portion and below its diameter (by cutting and removing the material to create small windows, or by cutting and bending the teeth/notches). Such empty spaces are then filled by the material itself of the flexible pipe to be connected to the fitting, when the pipe is pressed on the end portion due to the deformation of the bushing (or due to the effect of the deformation of the pipe itself in the case of fitting without a bushing, by directly pressing on the exterior of the pipe).

This penetration of material of the pressed pipe into the empty spaces defined by the through openings locks the pipe to the fitting, preventing a subsequent unthreading/removal of the pipe.

In addition to the locking portion, which allows the pipe to be stably anchored to the fitting, the present invention preferably provides the fitting with a seal portion—downstream of the locking portion with respect to the inlet/outlet opening of the fitting—provided with an appropriate gasket that ensures an even more effective hydraulic seal.

The presence of an additional seal portion allows the mechanical coupling function to be focused in the locking portion, provided with through openings, ensuring a correct seal for each type of flexible pipe, including multilayer pipes. In other words, the seal portion also makes it possible for the locking portion to be limited to obtaining the stable anchoring of the pipe and preventing the unthreading/removal thereof, since the seal is ensured downstream of the through openings.

The fitting object of the present invention can be advantageously used with a plurality of clamping grippers.

Finally, the fitting according to the present invention is characterized by a simple and functional construction.

The invention claimed is:

1. Fitting (1) for connecting pipes (T), comprising:
   at least one first tubular element (3) provided, at one end thereof, with a first inlet/outlet opening (3a) and at its interior defining a first duct (3b);
   at least one second tubular element (4) provided, at one end thereof, with a second inlet/outlet opening (4a) and at its interior defining a second duct (4b),
   said first (3) and second (4) tubular elements being connected to each other at respective opposite ends to the respective inlet/outlet opening, in a manner such that said first (3b) and second (4b) ducts are in communication with each other and overall define a joint duct (2) of the fitting placing said first inlet/outlet opening (3a) and said second inlet/outlet opening (4a) in fluid communication, wherein at least said first tubular element (3) is provided with at least one through opening (20), between an external surface (6) of the first tubular element and an internal surface (7) of the first tubular element directed towards, and defining, said first duct (3b),
   said through opening (20) defining a respective empty space (21) between the external surface (6) and the internal surface (7) of the first tubular element (3),
   the fitting being configured for operating at least in an insertion condition, in which it allows a pipe (T) to be fit around said first tubular element (3), and a clamping condition, in which the pipe is pressed and stably locked on the first tubular element (3) by means of a mechanical tool which deforms the pipe so that the pipe is mechanically locked to the fitting,
   wherein in said clamping condition, said empty space (21) defined by said at least one through opening (20) is configured for being exclusively occupied by a portion of said pipe (T) pressed on the first tubular element (3), so that the portion of said pipe (T) penetrating into said empty space (21) faces directly towards the interior of said first duct (3b), and wherein the penetration of material of the pipe (T) into said empty space (21) locks the pipe (T) to the fitting (1), preventing subsequent removal of the pipe (T), wherein said at least one through opening (20) is made by means of notching and removing the material that constitutes said first tubular element (3), and wherein said at least one through opening (20) has a specific closed polygonal form, and wherein said at least one through opening (20) has an edge (22) corresponding with said specific closed polygonal form.

2. The fitting (1) according to claim 1, also comprising at least one first bushing (11) associable with the first tubular element (3) in a manner such to externally surround it and to create, between the bushing itself and the first tubular element, an annular housing (12) destined to insertingly receive a pipe (T), such pipe being interposed between the first tubular element and the first bushing, said first bushing having an internal surface (11a), directed towards the external surface (6) of the first tubular element (3), and an external surface (11b), wherein said first bushing (11) is configured for operating in an insertion configuration, when the fitting is in said insertion condition, in which it allows the insertion of a pipe (T) in said annular housing (12), and a clamping configuration, when the fitting is in said clamping condition, in which it is pressed and stably locks, in a fluid-tight manner, the pipe in the annular housing, wherein in said clamping configuration said empty space (21) is occupied by a portion of said pipe (T) due to the pressure of said first bushing (11) on the first tubular element (3).

3. The fitting (1) according to claim 2, wherein the passage of the first bushing (11) from said insertion configuration to said clamping configuration occurs by means of a radial deformation of said first bushing (11), in moving closer to the first tubular element (3), such to compress the pipe (T) between the first bushing (11) and the first tubular element (3) within the annular housing (12), said deformation being made by acting on the external surface (11b) of the first bushing with a pinching profile (P1) of a clamping gripper (P), capable of plastically deforming said first bushing, and wherein the passage of the first bushing into said clamping configuration causes a reduction of the radial extension of the annular housing (12), caused by the approaching of the first bushing (11) to the first tubular element (3), and a consequent compression of the pipe (T) within the annular housing.

4. The fitting (1) according to claim 1, wherein said first tubular element (3) has a substantially hollow cylinder shape with a first longitudinal extension axis (X) and the material that constitutes the first tubular element (3) has a substantially constant section, said external surface (6) of the first tubular element defining a first diameter with respect to said first longitudinal extension axis (X), and wherein said empty space (21) lacks the material constituting said first tubular element at least at the section of the first tubular element.

5. The fitting (1) according to claim 1, wherein said at least one through opening (20) is made by means of executing a through cut in the material that constitutes said first tubular element (3), said through cut having a specific profile (23), and with a bending of part of the material identified by the profile (23) of said cut, and wherein said profile (23) of the through cut has a specific form, and wherein said at least one through opening (20) has an edge (22), on the external surface of the first tubular element, corresponding with said profile (23) of the through cut.

6. The fitting (1) according to claim 5, wherein said material identified by the cut profile defines, following said bending, a tooth (24) that is bent with respect to said hollow cylindrical extension of the first tubular element (3).

7. The fitting (1) according to claim 5, wherein said bending of part of the material identified by the profile (23) of said cut is towards the interior of the first tubular element (3) and towards said first longitudinal extension axis (X) in said first duct (3b).

8. The fitting (1) according to claim 5, wherein said profile of the cut is arranged on the first tubular element (3) in a manner such that a tooth (24) is bent with a free terminal end thereof directed towards the end of the first tubular element corresponding to said first inlet/outlet opening (3a), or wherein said profile of the cut is arranged on the first tubular element in a manner such that a tooth (24) is bent with a free terminal end thereof directed in an opposite direction with respect to the end of the first tubular element corresponding to said first inlet/outlet opening (3a).

9. The fitting (1) according to claim 1, wherein said empty space (21), defined by said through opening (20), corresponds with the section portion of the first tubular element (3) from which the material was removed, by means of the notching that makes the through opening, or wherein said empty space (21), defined by said through opening (20), corresponds with the section portion of the first tubular element (3) from which the material was removed by means of the cutting and subsequent bending of the material identified by the profile of the cut.

10. The fitting (1) according to claim 1, wherein said first tubular element (3) is provided with a plurality of through openings (20), made in different positions on said external surface (7), and wherein:

said plurality of through openings comprises a series of through openings (20) side-by-side each other to form an annular distribution around the external surface (6) of the first tubular element, said annular distribution being centered on said first longitudinal extension axis (X), or wherein said plurality of through openings comprises a series of through openings (20) aligned with each other to form a linear distribution along the external surface (6) of the first tubular element, said linear distribution being aligned parallel to said first longitudinal extension axis (X), or wherein said plurality of through openings comprises a series of through openings (20) side-by-side each other to form a curvilinear distribution around the external surface (6) of the first tubular element, or wherein said plurality of through openings comprises a set of through openings (20) side-by-side each other so as to occupy an entire sector of the external surface (6) of the first tubular element, or wherein said plurality of through openings comprises a set of through openings (20) side-by-side each other so as to occupy a cylindrical portion of the external surface (6) of the first tubular element, the through openings (20) being offset with respect to each other so as to attain a grid-like distribution or a network of through openings.

11. The fitting (1) according to claim 1, wherein the first tubular element (3) comprises:

a locking portion (30), which comprises said at least one through opening (20) or said plurality of through openings (20) and is configured for allowing, when said first bushing (11) is in said clamping configuration, the stable connection of the pipe (T) inserted in said annular housing (12), and preventing the unthreading/removal of the pipe from the fitting;

a seal portion (40), which comprises at least one seal element (41) externally wound around the first tubular element (3) in a manner such that the seal element is interposed between the seal portion of the tubular element and the pipe inserted in the annular housing, preventing the leakage of fluid between the first duct and the exterior of the fitting, said seal element (41) being a gasket or an O-ring.

12. The fitting (1) according to claim 11, wherein the locking portion (30) has a cylindrical shape and the seal portion (40) has a respective cylindrical shape, and wherein the locking portion (30) and the seal portion (40) are arranged in succession one after the other along a direction coinciding with said first longitudinal extension axis (X), or wherein the locking portion (30) is extended starting from said first inlet/outlet opening (3*a*), and the seal portion (40) is positioned downstream of the locking portion along the first longitudinal extension axis (X).

13. The fitting (1) according to claim 11, wherein said seal element (41) is externally wound around the first tubular element, in an annular seat (42) of the seal portion, so as to be substantially flush with an external diameter of the first tubular element.

14. The fitting (1) according to claim 11, wherein the seal portion (30) is positioned on the opposite side of the locking portion (40) with respect to the side where the first inlet/outlet opening (3*a*) is situated, or wherein the locking portion (30) and the seal portion (40) are in succession one after the other in said first tubular element (3), and they are continuously extended with respect to each other to form a first joint tubular element.

15. The fitting (1) according to claim 11, wherein said seal element of the seal portion of the first tubular element is deformable, when said first bushing is in clamping configuration, in order to prevent a fluid communication between the first duct (3*b*) and an external surface of the first tubular element.

16. The fitting (1) according to claim 1, comprising a second bushing (51) associated with the second tubular element (4) in a manner such to externally surround it and create, between the bushing (51) itself and the second tubular element, a respective annular housing (52) destined to insertingly receive a respective pipe, such pipe being interposed between the second tubular element and the second bushing, said second bushing (51) having an internal surface (51*a*), directed towards the second tubular element (4), and an external surface (51*b*), and wherein said second tubular element (4) is provided with at least one respective through opening (20), between an external surface of the second tubular element directed towards said second bushing and an internal surface of the second tubular element directed towards, and defining, said second duct (4*b*), said respective through opening (20) defining a respective empty space (21) between the external surface and the internal surface of the second tubular element, said second bushing (51) being configured for operating at least in an insertion configuration, in which it allows the insertion of a respective pipe in said annular housing (52), and a clamping configuration, in which the second bushing is deformed by the pressing of a mechanical tool so that the second bushing presses and stably locks, in a fluid-tight manner, the pipe in the annular housing, wherein in said clamping configuration said empty space (21) defined by said at least one respective through opening (20) is configured for being occupied by a portion of said respective pipe pressed between the second bushing and the second tubular element.

\* \* \* \* \*